US011481979B2

(12) United States Patent
Choi et al.

(10) Patent No.: US 11,481,979 B2
(45) Date of Patent: Oct. 25, 2022

(54) MOBILE AND AUGMENTED REALITY BASED DEPTH AND THERMAL FUSION SCAN

(71) Applicant: The Regents of the University of Colorado, a body corporate, Denver, CO (US)

(72) Inventors: Min-Hyung Choi, Superior, CO (US); Shane Transue, Arvada, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/049,859

(22) PCT Filed: Apr. 23, 2019

(86) PCT No.: PCT/US2019/028808
§ 371 (c)(1),
(2) Date: Oct. 22, 2020

(87) PCT Pub. No.: WO2019/209887
PCT Pub. Date: Oct. 31, 2019

(65) Prior Publication Data
US 2021/0248822 A1 Aug. 12, 2021

Related U.S. Application Data

(60) Provisional application No. 62/661,588, filed on Apr. 23, 2018.

(51) Int. Cl.
*G06T 19/00* (2011.01)
*G06T 3/40* (2006.01)
(Continued)

(52) U.S. Cl.
CPC ............. *G06T 19/003* (2013.01); *G06N 3/08* (2013.01); *G06T 3/4007* (2013.01); *G06T 7/20* (2013.01);
(Continued)

(58) Field of Classification Search
CPC ..... G06T 15/405; G06T 15/40; G06T 15/005; G06T 15/503; G06T 15/10
See application file for complete search history.

(56) References Cited

U.S. PATENT DOCUMENTS 9,685,065 B2  6/2017 Diels
10,796,403 B2  10/2020 Choi
(Continued)

FOREIGN PATENT DOCUMENTS

KR  10-1785202 B1  10/2017

OTHER PUBLICATIONS

J. Rangel; 2014; 3D Thermal Imaging: Fusion of Thermography and Depth Cameras.*
(Continued)

*Primary Examiner* — Todd Buttram

(57) ABSTRACT

Systems and methods are described for mobile and augmented reality-based depth and thermal fusion scan imaging. Some embodiments of the present technology use sophisticated techniques to fuse information from both thermal and depth imaging channels together to achieve synergistic effects for object recognition and personal identification. Hence, the techniques used in various embodiments provide a much better solution for, say, first responders, disaster relief agents, search and rescue, and law enforcement officials to gather more detailed forensic data. Some embodiments provide a series of unique features including small size, wearable devices, and ability to feed fused depth and thermal streams into AR glasses. In addition, some
(Continued)

embodiments use a two-layer architecture for performing device local fusion and cloud-based platform for integration of data from multiple devices and cross-scene analysis and reconstruction.

22 Claims, 21 Drawing Sheets

(51) Int. Cl.
*G06T 7/20* (2017.01)
*G06K 9/00* (2022.01)
*G06N 3/08* (2006.01)
*G06V 20/10* (2022.01)
*G06V 40/10* (2022.01)

(52) U.S. Cl.
CPC ............ *G06T 19/006* (2013.01); *G06V 20/10* (2022.01); *G06V 40/10* (2022.01); *G06T 2207/10028* (2013.01); *G06T 2207/10048* (2013.01); *G06T 2207/20221* (2013.01)

(56) References Cited

U.S. PATENT DOCUMENTS

| | | | |
|---|---|---|---|
| 2012/0281758 A1* | 11/2012 | Orlick ................ | H04N 19/176 375/240.14 |
| 2015/0062558 A1 | 3/2015 | Koppal et al. | |
| 2016/0019427 A1* | 1/2016 | Martin ............... | G06K 9/00771 382/103 |
| 2016/0140390 A1 | 5/2016 | Ghosh et al. | |
| 2016/0192009 A1* | 6/2016 | Sugio ................. | G06K 9/3241 725/32 |
| 2018/0005021 A1 | 1/2018 | Young | |
| 2018/0101960 A1* | 4/2018 | Boonyasiriwat ... | G06K 9/00771 |
| 2019/0020803 A1 | 1/2019 | Chen et al. | |
| 2019/0057286 A1* | 2/2019 | Woulfe ............... | G06K 9/6277 |
| 2019/0302963 A1 | 10/2019 | Harrison et al. | |
| 2021/0248822 A1* | 8/2021 | Choi ................... | G06K 9/00362 |

OTHER PUBLICATIONS

International Application No. PCT/US2019/028808, International Search Report & Written Opinion, 9 pages, dated Aug. 27, 2019.

Lussier, Jake T. et al., "Automatic Calibration Of RGBD And Thermal Cameras," IEEE/RSJ International Conference on Intelligent Robots and Systems, pp. 451-458, Sep. 14-18, 2014.

Prakash, Surya et al., "3D Mapping Of Surface Temperature Using Thermal Stereo," IEEE, 4 pages, 2006.

Rangel, J. et al., "3D Thermal Imaging: Fusion Of Thermography And Depth Cameras," 10 pages, 2014.

Transue, Shane et al., "Thermal-Depth Fusion For Occluded Body Skeletal Posture Estimation," 2017 IEEE/ACM International Conference on Connected Health: Applications, Systems And Engineering Technologies (CHASE), pp. 167-176, 2017.

Van Baar, Jeroen et al., "Sensor Fusion For Depth Estimation, Including TOF And Thermal Sensors," Second Joint 3DIM/3DPVT Conference: 3D Imaging, Modeling, Processing, Visualization & Transmission, pp. 472-478, 2012.

Vidas, Stephen et al., "3D Thermal Mapping Of Building Interiors Using An RGB-D And Thermal Camera," IEEE International Conference on Robotics and Automation, 9 pages, May 2013.

Weinmann, Martin et al., "Thermal 3D Mapping For Object Detection In Dynamic Scenes," ISPRS Technical Commission I Symposium, pp. 53-60, Nov. 17-20, 2014.

* cited by examiner

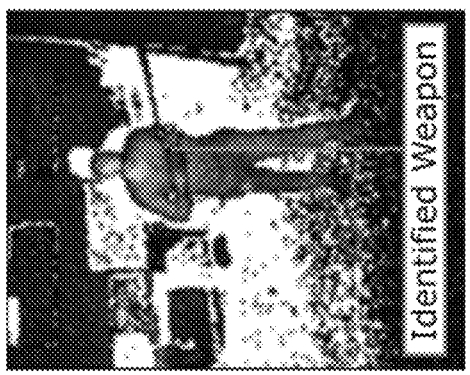
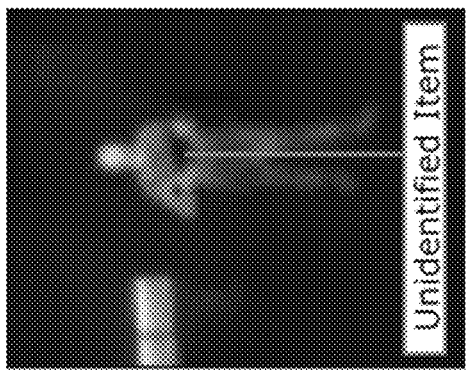
FIG. 16A
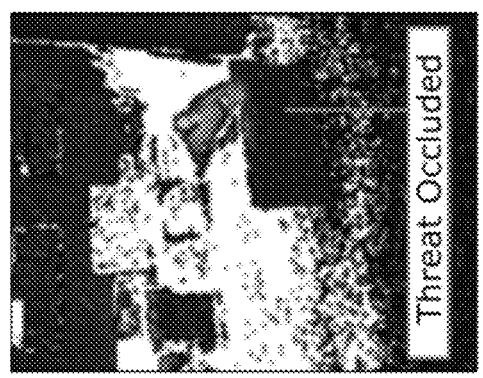
FIG. 16B
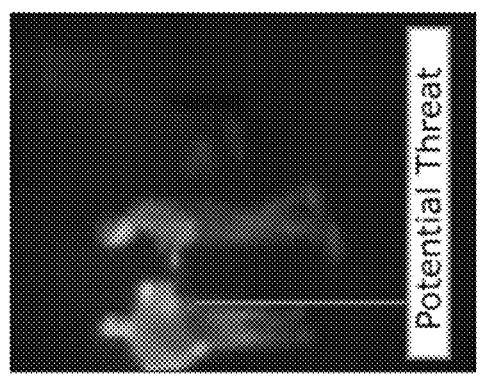
FIG. 16C
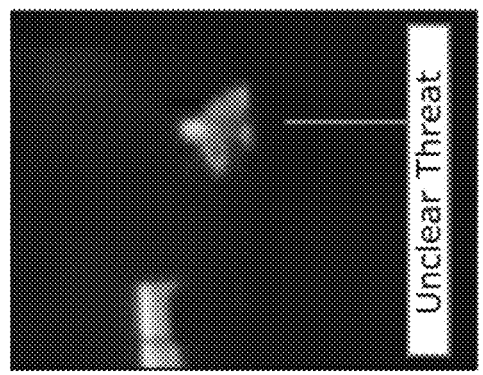

MOBILE AND AUGMENTED REALITY BASED DEPTH AND THERMAL FUSION SCAN

CROSS-REFERENCE TO RELATED APPLICATIONS

This application is a national stage, filed under 35 U.S.C. § 371, of International Patent Application No. PCT/US2019/028808 filed Apr. 23, 2019, which claims priority to U.S. Provisional Patent Application No. 62/661,588 filed Apr. 23, 2018, the entireties of which are incorporated by reference herein for all purposes.

TECHNICAL FIELD

Various embodiments of the present technology generally relate to imaging technologies. More specifically, some embodiments of the present technology relate systems and methods for mobile and augmented reality-based depth and thermal fusion scan imaging.

BACKGROUND

Visual documentation of crime scenes, hazardous conditions, and disaster areas incorporates a broad investigative process primarily performed by the integral members of first responder teams that explore and document complex scenes and environments. As the first person on the scene, a first responder must be acutely aware of specific details of the scene, potential environmental hazards, as well as any notable details they observe on their way to the scene and capture the intricacies of the environment and key pieces of evidence. In the broad array of scenes a first responder can encounter, this can incorporate a significant amount of important information that pertains to helping those in need and identifying potential dangers that may remain within an unknown environment. New developments in multi-modal sensing technologies enable first responders to now view scenes through contextually guided Augmented Reality (AR) assistance which can provide recorded evidence based on video and images collected during the initial investigation of an adverse environment.

Thermography has been widely used in the military, police forces, and engineering diagnostics purposes. However, thermal imaging has been generally underutilized for a broad set of investigative applications that include scene reconstruction for law enforcement, hazardous environment documentation, disaster relief, and AR guided search and rescue. Extensive use of thermal imaging in law enforcement has demonstrated the usefulness of this form of imaging for tracking fugitives through the use of helicopter-mounted thermal cameras. Thermography has also been shown to be useful for creating detailed pictures of recent fingerprint and palm prints on porous surfaces, a method of evidence collection typically done using an ionization and fragmentation technique. Additionally, some studies have used thermal imaging to examine the rate of cooling of objects after human contact, which could be used to cross-validate witness accounts and examine physical interactions. Though the wide adoption of thermography was previously hindered by the prohibitive cost and inconvenient size of these devices, the progression of thermal technology has resulted in the development of smaller and cheaper sensors, removing the barrier to entry and creating an opening for wider use of this technology for law enforcement, forensic, hazard, and disaster related field applications.

Another imaging technology that has been underutilized within interactive AR devices for investigative and forensic applications is depth imaging. Various 3D reconstruction techniques have been explored for their applicability to forensic science, disaster search and rescue efforts, and though they are currently not widely used by law enforcement, crime scene investigators, and other first responders due to the lack of feasible deployment embodiments of depth enabled AR devices. Several studies have proposed the use of Simultaneous Localization and Mapping (SLAM) to construct a 3D model of the environment for improved environmental analysis using numerous depth imaging devices. Another study used Instant Scene Modeler (iSM) and a handheld stereo camera to construct a 3D crime scene model from a series of two-dimensional images, but the results of this study showed poor view coverage in the 3D model due to camera motion estimation error. Additionally, these methods are not wearable or mobile solutions due to most depth imaging sensors being too large to be worn on the body or requiring a wired connection to a computer for operation. However, small, embedded depth sensors are now becoming available, and these sensors can already be seen in handheld devices such as the iPhone X, or the Structure sensor enabling us to integrate these new sensors into new devices for mobile depth sensing.

The combination of thermal and depth imaging has only been attempted in a limited number of studies, and these studies do not address any applications within large-scale deployments in forensics, disaster relief, and hazardous environment recording and exploration applications. One study combines depth and thermal images through edge mapping and non-linear optimization. However, the results can be easily biased, as complex scenes return multiple overlapped edges in the thermal signature, degrading the alignment accuracy of the fusion algorithm. Since accuracy is critical within numerous applications and limited existing work relates depth and thermal imaging to this directly to this domain, the focus of this proposal is to address both of these relatively untouched areas to introduce a robust fusion methodology for a guided assistance system embodied within an augmented reality solution.

SUMMARY

Systems and methods are described for mobile and augmented reality-based depth and thermal fusion scan imaging. Some embodiments of the present technology use sophisticated software algorithms to fuse information from both thermal and depth imaging channels together to achieve synergistic effects for object recognition and personal identification. Hence, the techniques used in various embodiments provide a much better solution for, say, first responders and law enforcement officials to gather more detailed investigative data. Some embodiments provide a series of unique features including small size, wearable devices, and the ability to feed fused depth and thermal video streams into AR glasses.

Thermal and depth-based imaging technologies have been used independently for various industrial and military applications. However, each imaging channel has its own drawbacks: thermal imaging doesn't provide clear geometric and structural definition, while depth imaging doesn't provide color or temperature information. By accurately fusing those two imaging channels, various embodiments of the present technology provide a substantial synergistic effects in object identification, investigative environment reconstruction and personal authentication.

Some embodiments provide a forensic analysis system that includes a set of multiple scanning devices and a cloud-based fusion service. The scanning devices may include static devices that can be placed in a fixed position within a local environment, have a mobile form factor allowing the scanning devices to be worn by users (e.g., first responders, police, fireman, etc.), or robotic mechanisms (e.g., autonomous vehicles, drones) to allow the scanning devices to navigate into areas unreachable by humans (e.g., for safety and disaster search and rescue). Each of the scanning devices can have a set of sensors to collect images (e.g., depth images, thermal images, etc.) that can be fused together locally by each of the multiple scanning devices to create multiple sets of fused images of a local environment. The fused images (and/or raw images) can be transmitted to the cloud-based fusion service. In accordance with various embodiments, the cloud-based fusion service can use artificial intelligence, deep learning, and/or other techniques to extract features within the environment and transmit a classification of the features to the set of multiple scanning devices to assist users in evaluating the local environment.

In some embodiments, the images collected by the sensors (e.g., the thermal images and the depth images of the local environment) may be captured at different rates. Each scanning device can generate time-indexed sequences of the collected images allowing a local fusion engine to generate the fused images with temporal interpolation and spatial interpolation between entries. The cloud-based fusion service can be configured to generate a map or three-dimensional reconstruction of the local environment from the multiple sets of fused images.

In some embodiments, a depth and thermal imaging system (e.g., a scanning device) can include a processor, a memory, a housing, a local fusion engine, a display, a communications component, and/or other hardware and software components (e.g., an inertial measurement unit or gyroscope) for collecting data about the system and/or a local environment (e.g., a crime scene). The housing can be shaped enclosing a set of sensors with different imaging modalities. For example, in some embodiments, the set of sensors can include a thermal sensor and a depth sensor each configured to collect thermal images and depth images of the local environment. The local fusion engine, under the control of the processor, can be configured to receive the thermal images and the depth images of the local environment collected by the set of sensors and generate a set of fused images (e.g., by combining the thermal images with the depth images). The fused images can be rendered on the display and the communications component can transmit some or all of the fused images, the thermal images, the depth images, and/or other information to the remote fusion service. The remote fusion service can provide a variety of computationally expensive services such as, but not limited to, evidence cross-referencing, data-analytics, sematic labeling of the local environment, ballistics analysis, and/or the like. This information can be transmitted back to one or more of the devices to provide graphical overlays to assist analysis of the local environment.

Some embodiments provide a method for operating a fusion service. The method can include receiving, from multiple scanning devices, fused images of a local environment from different angles or continuous image streams from each device. Using a classification engine, a set of semantic labels associated with objects or people within the local environment can be generated. The set of semantic labels can be transmitted to each of the multiple scanning devices to provide a graphical overlay to assist users in evaluating the local environment. In some embodiments, a three-dimensional reconstruction and/or map of the local environment can be generated from the fused images received from the multiple scanning devices. The fused images may be associated with a time index in some embodiments.

Embodiments of the present technology also include computer-readable storage media containing sets of instructions to cause one or more processors to perform the methods, variations of the methods, and other operations described herein. For example, in some embodiments, a storage device or non-transitory computer-readable storage medium can contain a set of instructions that when executed by one or more processors cause a machine to capture images of a template using multiple image capture channels with different imaging modes. A local fusion model can be trained on the relational movement of the template within each of the multiple image capture channels to establish a nonlinear spatial relationship between the different imaging modes. Then, an execution model can be generated based on the nonlinear spatial relationship to fuse images captured by the multiple imaging channels.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

FIGS. 16A-16C provide various illustrates of threat identification through thermal and depth fusion provided by various embodiments of the present technology.

Figure 1:
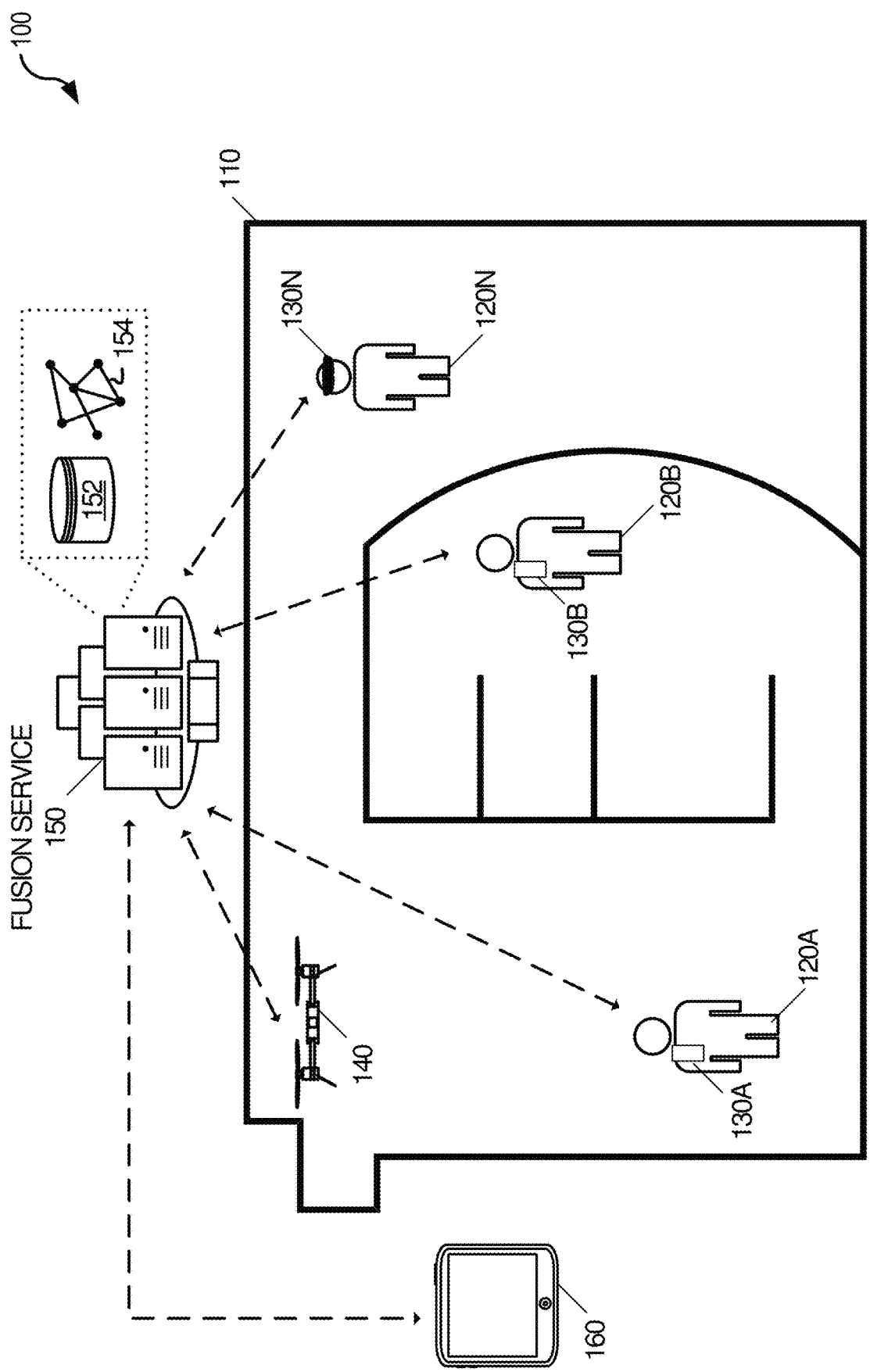
FIG. 1 illustrates an example of an environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to imaging technologies. More specifically, some embodiments of the present technology relate systems and methods for mobile and augmented reality-based depth and thermal fusion scan imaging. Historically, traditional imaging systems have either used thermal or depth imaging. Thermal imaging has the drawback of not providing structural or spatial definition. Depth imaging does not have temperature or color information. In contrast, various embodiments of the present technology provide for better accuracy and image quality from the combined thermal and depth signals through advanced software techniques.

In modern forensics, surveillance, and disaster relief efforts it is important to record time-critical evidence and identify critical observations about the environment at the earliest possible moment. However, this is difficult to achieve without hindering first responders' normal duties and is often delayed until additional investigators arrive on the scene, by which time prevalent evidence may have been modified or disturbed. To empower first responders to capture time-sensitive visual evidence without requiring additional work or device management, various embodiments of the present technology provide a new imaging method that integrates Depth and Thermal (DT) streams of images into a mobile solution for automated scene reconstruction, evidence recording, guided visual feedback mechanisms, and authentication.

While depth and thermal imaging have been primarily used as independent scanning devices, various embodiments of the present technology maintain the benefits of each of these imaging modalities while demonstrating how the synergy obtained from this fusion will make a significant contribution to evidence collection and pioneering forensic imaging, surveillance, and environmental reconstruction methods. As opposed to traditional forms of documentation, which only provide partial snapshots of scenes from a limited number of perspectives, various embodiments of the present technology provide a comprehensive method for reconstructing environments using 3D thermal point-clouds recorded through the use of wearable and Augmented Reality (AR) devices that obtain continuous streams of data from the embedded imaging devices.

Various embodiments provide for novel techniques of forensic scene analysis, augmented reality, and surveillance that accurately fuses thermal and depth imaging for improved image clarity and definition and automated documentation of environmental scene information. The fusion of these sensors, realized within a hand-held or wearable wireless device, can be used to provide a 3D model of the environment integrated with heat and color information. This information will provide a deeper understanding and insight of the scene and can be a critical source of evidence for forensic analysis that has been previously underutilized.

In this direction, various embodiments provide for the reconstruction of scenes using depth-thermal (DT) fusion devices with one or more of the following: (1) an accurate and reliable method for combining both depth and thermal imaging modalities, (2) the implementation of this solution as a mobile device for first-responder use, (3) three-dimensional scene reconstruction with thermal measurements built over wireless communications with remote servers that enable expansive cloud computing capabilities, and (4) the extraction of pertinent forensic, hazardous, and surveillance information of 3D environments using semantic feature extraction through big data analysis and deep learning. In addition to feature extraction, the use of big data and deep learning techniques can further improve the utility and quality of depth-thermal fused scene reconstructions. This will provide new forms of authentication, evidence tracing, and recurrent pattern analysis within surveillance methodologies.

Various embodiments provide a novel set of mobile solutions that enable the collection of 3D thermal point-clouds through real-time fusion of depth and thermal image streams. These mobile devices will provide an unobtrusive and automated method for accurately reconstructing crime scenes. In accordance with some embodiments, a set of depth and thermal sensing mobile devices can be worn or placed at the scene to provide critical structural information about the environment, the state of the scene in 3D space, and accurate temperature readings. This information can then be used to identify subjects, objects, provide new forms of authentication, ballistics modeling, and link information between crime scenes using deep reinforcement learning and cross-validation models.

Some embodiments create a high-resolution fusion of thermal and depth images, which will provide a 3D point-cloud with accurate thermal measurements. To provide a robust method of fusing depth and thermal images from any pair of available devices in a mobile solution, various embodiments address alignment complexities from device intrinsic and extrinsic properties through automated image-registration (fusion) using machine learning.

In some embodiments, mobile devices (e.g., wearable and AR) can be used to facilitate DT imaging through the inclusion of three imaging sensors (visible light, depth, and thermal), and wireless communication. Various embodiments of these devices can provide front-end data collection with remote communication to back-end servers that provide big data analysis and deep learning for object recognition and physical trace analysis for automated evidence collection. This introduces a two-layer architecture for performing device local fusion and cloud-based analysis in various embodiments.

Some embodiments provide two high-level contributions to forensics screening and investigative 3D reconstructions: (1) DT feature extraction for object detection, physical trace, scene, and environmental analysis, and (2) real-time DT scene reconstructions for automating existing forensic and surveillance procedures such as tracing, measurement, authentication, and ballistics analysis and creating a new method for surveillance.

The accuracy of the fused data can be validated by qualitatively assessing the utility of the devices, and improve object tracking, identification, and authentication through automated data collection. In accordance with various embodiments, this can involve using collected data to observe new forms of evidence to link unforeseen correlations between distinct forensic scenarios through the use of machine learning and big data analysis. This allows the broadening of how individual scenes are linked through cross-correlation analysis and discover relational evidence on larger scales. For example, various embodiments of the present technology may be used by first responders, law enforcement, medical imaging (with thermal information), civil and architectural Engineering (e.g., for structural health monitoring of civil structures), and/or others.

Various embodiments of the present technology provide for a wide range of technical effects, advantages, and/or improvements to computing systems and components. For example, various embodiments include one or more of the following technical effects, advantages, and/or improvements: 1) fusion algorithms are substantially improved in accuracy based on AI deep learning; 2) fusion algorithms that are efficient to be used on a small low powered mobile platform; 3) algorithms that are designed in two tiers: first by the mobile system itself for quick response, and second by a backend server through wireless communication mechanism for in-depth analysis; 4) new design and form factor of a wearable and hand-held mobile device which is directly related to the algorithm's performance and network connectivity; 5) new design and form factor of an augmented reality glasses; 6) introduction of wearable and portable devices that are continuously connected to backend servers by wireless communication; 7) new arrangement through an AR glasses that provides new ways of utilization for object identification, personal authentication, and gathering important data for forensic, industrial and healthcare application; 8) use of unconventional and non-routine computer operations to provide increased information about an environment when the lighting conditions are not ideal and/or other cases where temperature changes hold important information; 9) cross-platform integration of machine learning to achieve synergistic effects for object recognition and personal identification; and/or 10) bridge between traditional forensic techniques and how DT imaging is used to improve forensic evidence collection and provide 3D reconstructions of complex scenes.

In the description, for the purposes of explanation, numerous specific details are set forth in order to provide a thorough understanding of embodiments of the present technology. It will be apparent, however, to one skilled in the art that embodiments of the present technology may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

General Overview

FIG. 1 illustrates an example of an environment 100 in which some embodiments of the present technology may be utilized. As illustrated in FIG. 1, environment 100 includes building 110 in which multiple users 120A-120N (e.g., first responders) are exploring. Each of the multiple users 120A-120N are equipped with scanning devices 130A-130N. In addition, various robots, such as drone 140, may be equipped with scanning devices to provide access to views (e.g., aerial view) and/or dangerous or volatile areas humans may be unable to access. In some embodiments, scanning device 130A-130N can include wearable devices (e.g., body cameras with thermal imaging, augmented reality head-mounted displays, etc.).

In accordance with some embodiments, scanning device 130A-130N may facilitate depth-thermal (DT) fusion imaging through the inclusion of multiple imaging sensors (e.g., visible light, depth, and thermal), and wireless communication. The scanning devices 130A-130N can collect and report data about the environment of building 110 to fusion service 150. Fusion service 150 can store the collected data in database 152 and may use artificial intelligence engines for training local fusion algorithms running on scanning devices 130A-130N and robotic devices 140 as well as for real-time object detection, physical trace analysis, scene analysis, and environmental analysis which can be reported to computing device 160 (e.g., in a mobile or remote command center). As such, scanning devices 130A-130N can provide front-end data collection with remote communication to back-end servers that provide big data analysis and deep learning for object recognition and physical trace analysis for automated evidence collection. This introduces a two-layer architecture for performing device local fusion and cloud-based analysis in various embodiments.

In some embodiments, scanning devices 130A-130N, robotic devices 140, fusion service 150, and computing device 160 may include network communication components that enable these devices to communicate with remote servers or other portable electronic devices by transmitting and receiving wireless signals using licensed, semi-licensed or unlicensed spectrum over a communications network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network can also include third-party communications networks such as a Global System for Mobile (GSM) mobile communications network, a code/time division multiple access (CDMA/TDMA) mobile communications network, a $3^{rd}$, $4^{th}$, or $5^{th}$ generation (3G/4G/5G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Building 110 may be a crime scene, for example, and users 120A-120N may be first responders (e.g., police, FBI agents, paramedics, etc.) Though it may be relatively unnoticeable to the untrained eye, crime scenes are dynamically changing environments. Some of these changes occur quickly, such as the dissipation of thermal signatures, like melting snow tracked into an apartment or how electronics maintain heat after use. Any delay in forensic evidence collection increases the risk of missing these time-dependent pieces of evidence. Human traffic represents another significant risk to evidence collection; as more investigators appear at the scene, the risk of contaminating or losing crucial evidence increases. The importance of recording evidence as quickly and thoroughly as possible while limiting the risk of contamination cannot be understated. This is why the ideal candidate to record the crime scene is the first responder.

In order to not burden first responders with additional responsibilities, various embodiments of scanning devices 130A-130N may be wearable camera devices with integrated depth and thermal sensors for automated, unobtrusive and comprehensive crime scene data collection. This detailed data can be used to inform the first responders' decisions at the scene, or the detailed data can be thoroughly analyzed at a later time, even as the scene returns to its normal state. This method of data collection by first responders provides the best chance of collecting non-polluted evidence at the earliest possible moment, with the least amount of contamination.

The fusion of depth and thermal imaging provides more detailed information about a crime scene than these sensors could provide individually. A thermal image of a crime scene may reveal heat signatures that give unique insight into the circumstances of a crime, but this image lacks structural information and is highly ambiguous because edges are not well defined. Depth imaging generates structural information about a crime scene environment, but on its own, does not provide color or thermal information. These sensors could be used as separate devices, but this presents an alignment issue, not only in space, but in time. Each image would need to be taken from the exact same perspective and would need to be corrected for physical differences between the cameras.

Additionally, the changing nature of a crime scene environment, especially in the thermal domain, underlines the importance of taking these images at the same time. Various materials have different thermal properties which dictate their rate of heat loss, making it crucial to capture thermal information as quickly as possible. This is why the fusion of depth and thermal imaging is so promising for forensic data collection and processing: all of these channels of information are provided, aligned both spatially and temporally, so that there is a direct correspondence between these channels. This breadth of data aligned in both time and space allows for faster and easier visual assessment by forensic investigators and is also in an optimal format for post-processing using deep learning and big data techniques.

Image fusion is the process of combining different types of cameras to merge multiple image types into a single aggregate image. Pinhole models that incorporate both the intrinsic properties of each camera, such as field-of-view (FOV), focal-length, resolution, or sensor array dimensions, and the extrinsic properties of the spatial relationship between the cameras, have been used to superimpose the images from both devices into a single, shared, coordinate system. The most popular instance of this technique is the fusion between normal color images (RGB) and depth (D) cameras, resulting in a fused imaging modality: RGB-D. This process is well defined and has been used extensively in computer vision and machine learning for various uses, including robot path planning, facial expression recognition, object identification, gait analysis, and 3D scene reconstruction.

Alignment of depth and thermal images requires more than simply overlaying the two channels. Moreover, image transformations such as rotating and scaling are also generally not going to produce a close enough alignment between the images. This is primarily due to differences in physical camera properties; two cameras with differing fields of view, optical distortions, and focal lengths will produce two very different images, even when taken from the same position and perspective. Various embodiments build on existing calibration techniques that take into account the differing physical properties of the two image sensors but introduce an automated and robust training method for establishing the fusion using a nonlinear function and machine learning. This will result in a much better alignment of the two images, which is of critical importance for visual inspection of the data by forensic analysts, as well as for later post-processing.

Depth and thermal fusion images can be used in two different scenarios: local law enforcement and first responders on the scene could look at this data immediately after capture in order to make informed decisions, and this data could also be sent to a forensic lab for post-processing and further analysis. Deep learning techniques (e.g., by AI engine 154) can be applied to the fused thermal and depth images to identify objects and people, or to extract information about the scene. This technique could also potentially be used to find correlations between different crime scenes, which is of particular interest to state law enforcement, providing a semantic analysis of crime scenes.

Existing depth-thermal (and RGB-D) fusion methods assume a simple linear pinhole camera model that describes how the FOV, focal point, and resolution compose the resulting photograph. Based on this model, the relationship between cameras can be established, and a 6D transformation (3D-rotation, 3D-translation) can be computed to map RGB values to depth points, which forms a colored 3D image. The problem with this approach is in the assumption that both cameras are ideal pinhole cameras. Differing physical dimensions of the sensors make this assumption untrue, though this approach is sufficient to provide an adequate alignment with cameras that have similar intrinsic properties.

The alignment error of these models is directly related to the differences in the intrinsic properties of the cameras and how they are physically mounted. Time-of-flight (TOF) depth sensor arrays are generally designed to have wide FOVs, sparse data samples, and distance errors; whereas thermal cameras commonly have narrow FOV lenses, contain radial and tangential distortions, and have limited range (sparse coverage, error as a function of distance). Existing linear models are not well-suited to provide highly accurate alignments between these drastically different designs. Recent techniques for DT fusion incorporate optimization may be used to provide improved alignments, but these are computationally expensive and depend on the content within both the depth and thermal images. As such, various embodiments provide a novel and automated fusion process between depth and thermal imaging.

Various embodiments use mobile DT imaging devices to produce high-resolution interior and exterior reconstructions of 3D point-clouds with thermal data. Recent state-of-the-art depth and thermal fusions using non-wearable sensors for human segmentation and 3D environment reconstruction for both interior and exterior environments. This includes human segmentation with depth and thermal imaging, (b) 6D SLAM-based reconstructions of large exteriors using thermal mapping, and (c) interior and object thermal imaging for dense point-clouds using stationary (non-wearable) scanners.

Existing depth-thermal (and RGB-D) fusion methods assume a simple linear pinhole camera model that describes how the FOV, focal point, and resolution compose the resulting photograph. Based on this model, the relationship between cameras can be established, and a 6D transformation (3D-rotation, 3D-translation) can be computed to map RGB values to depth points, which forms a colored 3D image. The problem with this approach is in the assumption that both cameras are ideal pinhole cameras. Differing physical dimensions of the sensors make this assumption untrue, though this approach is sufficient to provide an adequate alignment with cameras that have similar intrinsic properties. This technique can be used with the aid of a template (such as a checkerboard) that is visible to both cameras, to compute a homography of the relationship between the cameras for alignment. Various embodiments emphasize the importance of accuracy as a core objective in the fusion, thus building alignment algorithm on template-based methods.

The alignment error of these models is directly related to the differences in the intrinsic properties of the cameras and how they are physically mounted. Time-of-flight (TOF) depth sensor arrays are generally designed to have wide FOVs, sparse data samples, and have limited range (sparse coverage, error as a function of distance); whereas thermal cameras commonly have lens distortion, which may include both radial and tangential distortions, and Existing linear models are not well-suited to provide highly accurate alignments between these drastically different designs. Recent techniques for DT fusion incorporate optimization to provide accurate alignments, but these are computationally expensive and depend on the content within both the depth and thermal images.

Figure 2:
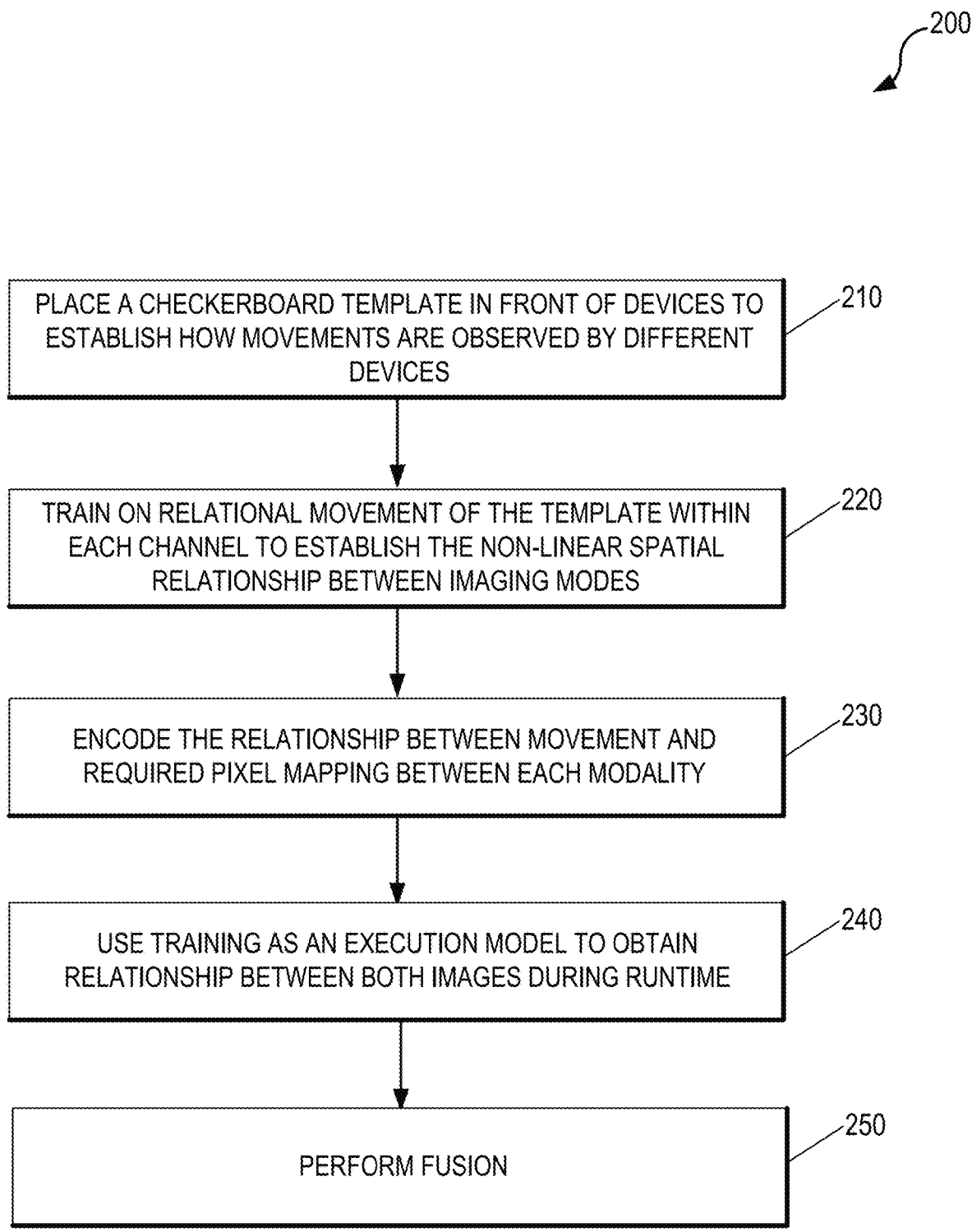
FIG. 2 is a flowchart illustrating a set of operations for generating an improved fusion algorithm using artificial intelligence in accordance with various embodiments of the present technology.

FIG. 2 is a flowchart illustrating a set of operations 200 for generating an improved fusion algorithm using artificial intelligence in accordance with various embodiments of the present technology. As illustrated in FIG. 2, in observation operation 210 a template (e.g., a checkerboard template) or known object can be placed in front of each device to establish how the movements are observed. Then, training operation 220 can train, using observations with the known object, the relational movement of the template within each channel to establish the non-linear spatial relationship between the two imaging modes. The model encodes the relationship between this movement and the required pixel mapping between each modality during encoding operation 230. This training is then used during deployment operation 240 as an execution model to obtain the relationship between both images during runtime and performs the fusion in fusion operation 250.

In accordance with various embodiments, this process can provide accurate calibration using a depth-thermal template and may be built off of recent contributions for automated non-linear modeling to establish a more accurate thermal depth fusion and pixel level registration. Some embodiments of this model introduce a machine learning technique for training on non-linear transformation to reduce the computational complexity of the fusion algorithm. This is due to removing edge detection, correspondence matching, and per-frame non-linear optimization. This allows some embodiments to perform the fusion on mobile devices with lower compute capabilities.

Some embodiments of the present technology provide an automated and unobtrusive device that complements existing evidence collection and surveillance methods while addressing well-established problems in scene recording using traditional photographs and videos. In addition to capturing 2D photos of scenes, some embodiments of the DT imaging devices can capture depth and thermal images of the environment that can be used to map, measure, and reconstruct 3D scenes with complete thermal measurements. The information that can be extracted from this fusion can be extended, in some embodiments, to include higher-level semantics within complex scenes based on deep learning techniques. Some embodiments provide a new form of mobile data acquisition using depth and thermal fusion, the complete reconstruction of 3D scenes for recording structural and thermal data, and a set of analysis tools to identify key pieces of evidence based on deep reinforcement learning and big data analysis. This can be achieved, in some embodiments, through the integration of a two-layer architecture that provides immediate user feedback as well as remote data analytics processing to provide segmentation, semantic labeling, evidence cross-referencing and surveillance identifiers.

Figure 3A:
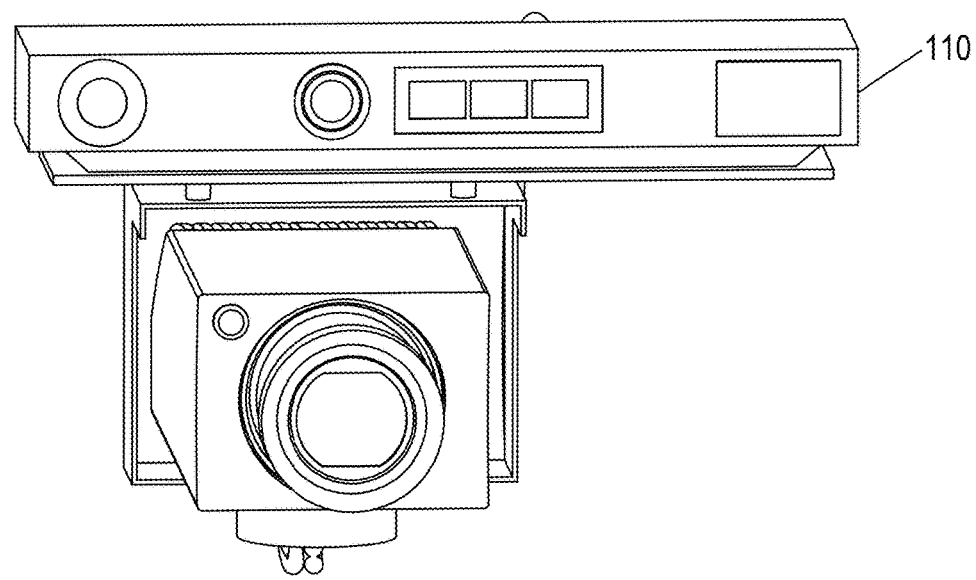
FIG. 3A illustrates an example of a depth-thermal fusion prototype hardware solution combining Microsoft Kinect-2 and FLIR A-Series camera that may be used in some embodiments of the present technology.

FIG. 3A illustrates an example of a depth-thermal fusion prototype hardware solution combining Microsoft Kinect-2 and FLIR A-Series camera that may be used in some embodiments of the present technology. As illustrated in FIG. 3A, a multi-camera device 310 can facilitate real-time streams of both depth and thermal images. Due to the recent advancements in the miniaturization of commercially available sensors, these devices can be consolidated into a small wearable solution to provide an unobtrusive method of recording depth and thermal images. To ensure the successful development and deployment, various embodiments of the present technology have been segmented into four components: 1) the preliminary stationary device for DT imaging, 2) the robust fusion and data integration between the depth and thermal cameras, 3) the miniaturization of the devices to a mobile solution, and 4) the wireless communication used to transfer data to remote servers for analytical analysis and reinforcement learning.

Figure 3B:
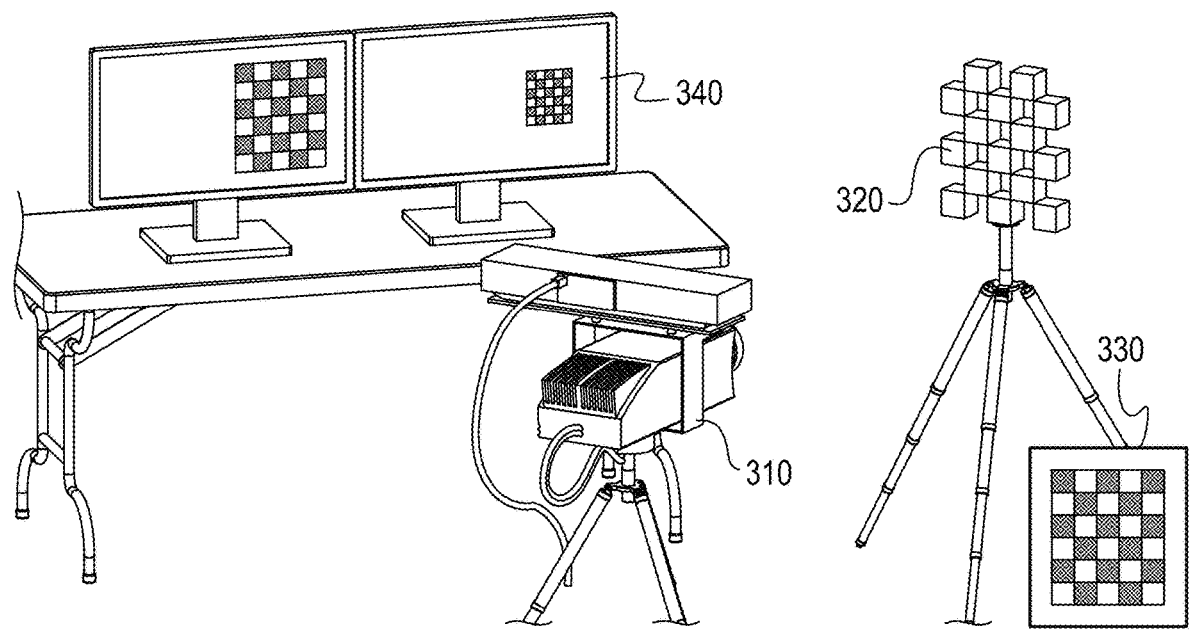
FIG. 3B illustrates a template-based approach for a highly accurate alignment for DT images for a fusion technique used in one or more embodiments of the present technology.

FIG. 3B illustrates a template-based approach for a highly accurate alignment for DT images for a fusion technique used in one or more embodiments of the present technology. As illustrated in FIG. 3B, the system can include a multi-camera device 310, template 320, thermal calibration unit 330, and computing system to generate the fusion results 340. Multi-camera device 310, in some embodiments, can include four main sensors: a high-resolution RGB camera, thermal camera, depth transmitter (D-Tx), and depth receiver (D-Rx), all of which can be enclosed in a 3D printed case. Some designs of the fusion system can be based on the following set of considerations, usability, and implementation objectives: 1) miniaturization and mobile solution; 2) robust data collection and integration; 3) wireless communication; and 4) lab quality fusion.

For example, in some embodiments, the integrated depth and thermal cameras can be combined with a computing device that can be worn by a first-responder. This requires an unobtrusive design that does not interfere with normal work practices, and enough power to provide the onboard processing for fusion, recording, and wireless operations. DT fusion may be performed in some embodiments on the mobile device, and the resulting images can then be transferred to a remote server for feature extraction. The data can then be integrated into the evolving evidence correlation model for training.

Due to the limited internal storage on mobile devices and the redundancy required for critical evidence, some embodiments provide wireless communication methods for transferring data for both further analysis and backup procedures. Additionally, through wireless communication, using multiple synchronized devices can improve the coverage rate (time) for mapping a crime scene environment. To provide lab-quality depth-thermal fusion, some embodiments may use two existing high-performance thermal and depth imaging devices. For a proof-of-concept prototype, two commercially available cameras were combined to demonstrate the feasibility of depth-thermal fusion. In this preliminary study, an infrared thermal camera was used to provide thermal images, and a depth imaging device to provide depth images and point-cloud reconstruction.

To pair the devices, various embodiments may mount the devices on a shared tripod mount with a custom bracket for alignment. For the calibration process, some embodiment use a DT template that allows the standard checkerboard calibration pattern to be visible to each camera. This template design includes elevated blocks for low and high regions in the depth image, and power-heated tiles to illuminate the pattern in the thermal image. The fused DT template is shown in FIG. 3B, along with the result of the fusion used to visualize physical trace evidence and a human figure in real-time using the current prototype.

Figure 3D:
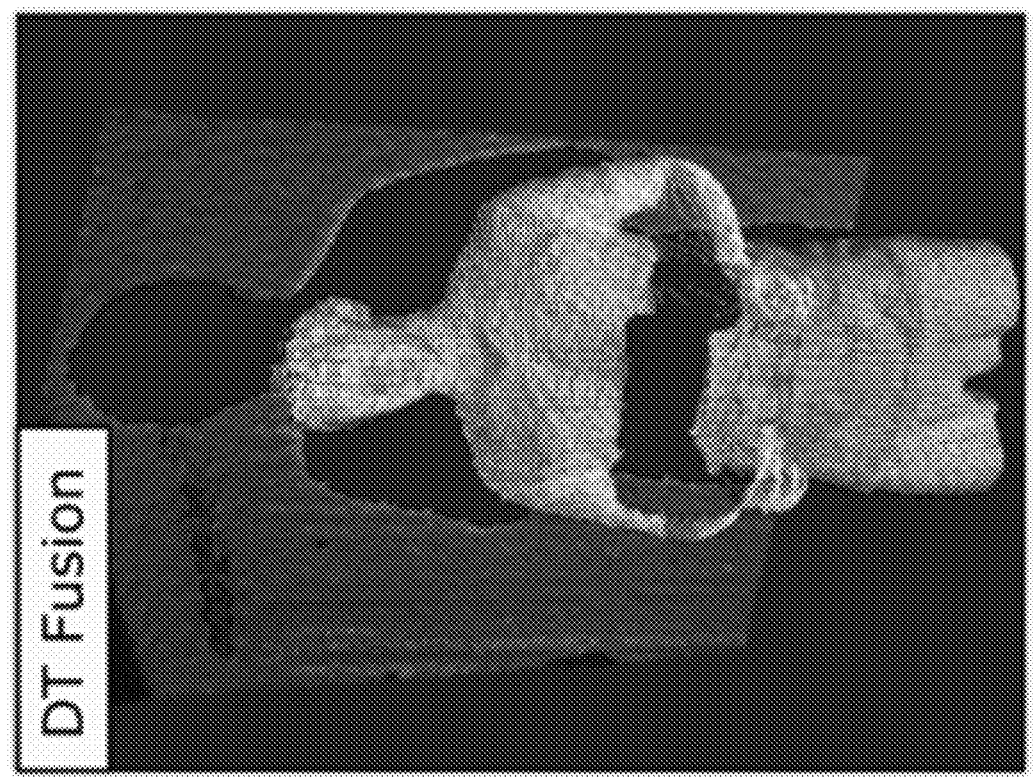
FIG. 3D illustrates an example of a highly accurate real-time depth-thermal streams that may be produced in one or more embodiments of the present technology.
Figure 3C:
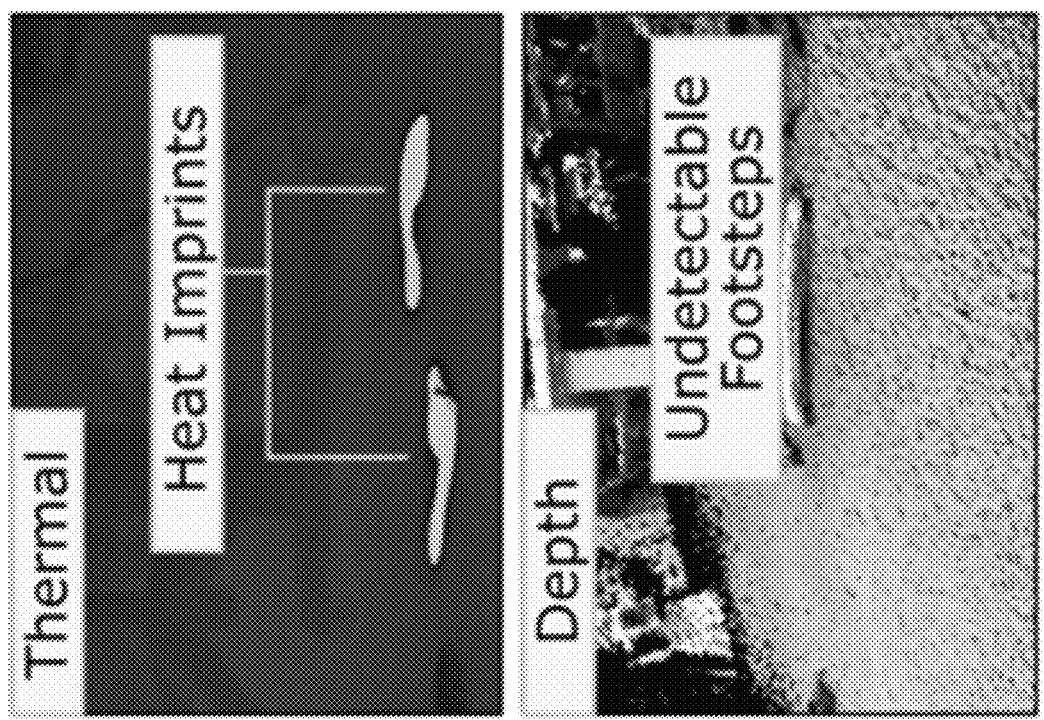
FIG. 3C illustrates how various embodiments of the present technology can be used for evidence collection.

FIG. 3C illustrates how various embodiments of the present technology can be used for evidence collection. More specifically, FIG. 3C provides an example of how thermal imaging can be used for recent environmental traces obtained through the DT fusion with respect to evidence collection. Spatial context, such as dimensionality and stride length can be provided from the depth image that can be converted into a 3D point-cloud representation. Due to the heat trace being invisible to within the visible spectrum and infrared spectrum of the depth image, the thermal mode provides the physical trace of the recent event.

FIG. 3D illustrates an example of a highly accurate real-time depth-thermal streams that may be produced in one or more embodiments of the present technology. As illustrated in FIG. 3D, the fusion that can be obtained within a mobile form factor that can provides low-resolution depth and thermal images. Based on the feasibility of this prototype, DT Fusion data provide adequate structural detail and thermal signatures to identify both objects and evidence traces relevant to scene reconstruction.

Figure 4A:
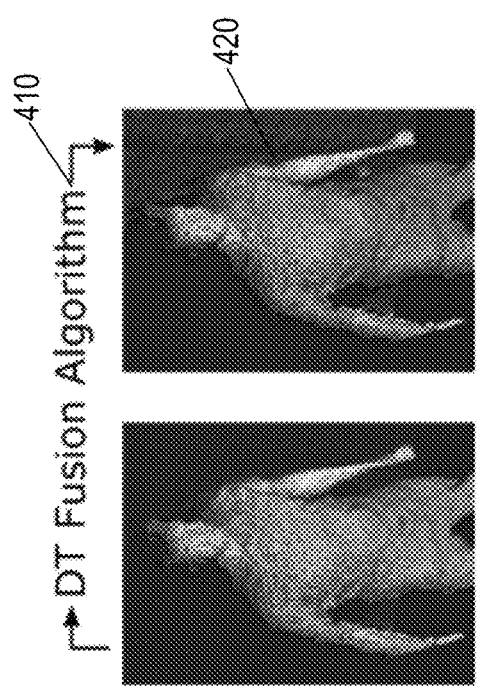
FIG. 4A illustrates the result of the DT Fusion Algorithm for generating a thermal-cloud for visualizing a human figure in 3D space in accordance with some embodiments of the present technology.
Figure 4B:
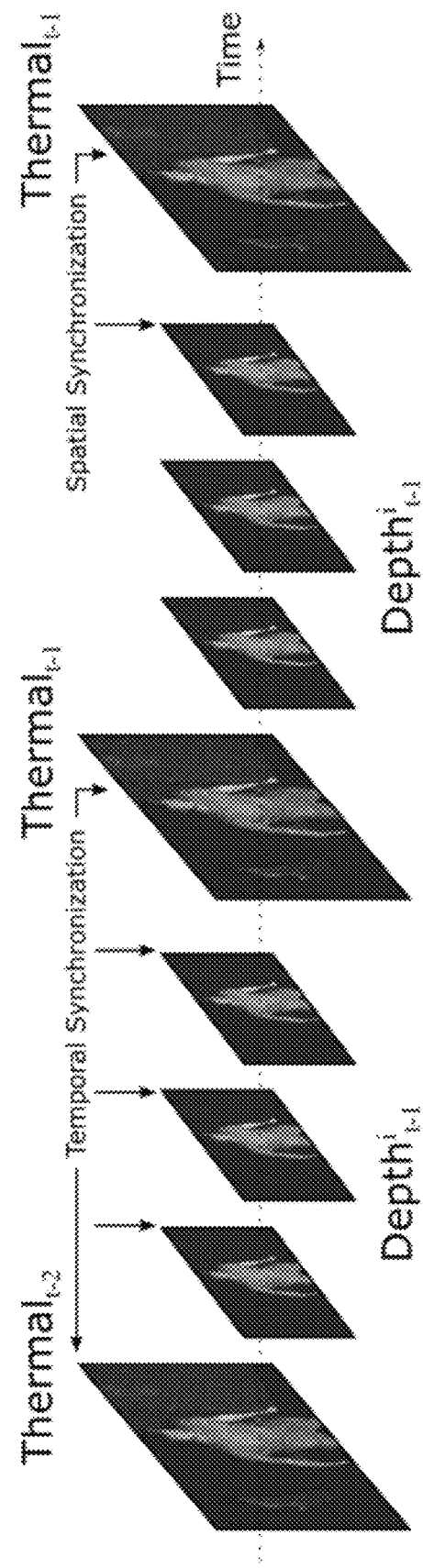
FIG. 4B illustrates an example of synchronization of depth and thermal images through spatial and temporal interpolation using closest timestamps that may occur in various embodiments of the present technology.

FIG. 4A illustrates the result of the DT Fusion Algorithm 410 for generating a thermal-cloud for visualizing a human FIG. 420 in 3D space in accordance with some embodiments of the present technology. Device spatial (resolution) and temporal (frame rate) synchronization is the first important aspect of fusing multiple modalities from different imaging devices. Some embodiments may synchronize multiple modalities using phase synchronization and time shifting. However, this may be computational expensive. As such, some embodiments use a practical and inexpensive fusion solution that addresses frame rate differences between the depth and thermal devices through temporal interpolation. In addition, some embodiments may address resolution discrepancies through spatial interpolation. By using temporal interpolation and spatial interpolation, some embodiments are able to provide consistent synchronization between the image streams generated by both devices. The image sequence in FIG. 4B illustrates the depth and thermal image sequences over time, synchronized to nearest timestamp values recorded within the image sequence.

In accordance with various embodiments, the DT fusion algorithm may be composed of a three phase modeling process. The first phase can introduce a data collection process that obtains context-dependent alignment of the images from both the depth and thermal images. This can be done, for example, through feature and edge point detection within both modalities. Based on the correlation between these key points and edges, various embodiments can obtain an image-space alignment between the content of the two images. This generates an initial image-space transformation between the two image modalities that is used for training a machine learning driven model.

As the second phase, this trained model can then predict the transformation required to align the image streams from both the depth and thermal devices. During runtime, the model is no longer context dependent and provides a reliable fusion while minimizing runtime. The final phase accounts for the inaccuracies generated through the initial fusion transformation based on the errors accumulated within the key and edge point optimization in image-space. The third phase may be composed of a refined alignment procedure that allows for small non-linear adjustments to the alignment to ensure that corresponding edge and key points are precisely aligned. The complete runtime process is defined by the execution of the alignment model and the subsequent non-linear modifications of the initial fusion to improve the accuracy of the alignment between the two modalities.

Figure 5A:
FIGS. 5A-5D illustrates an example of preliminary results of the DT fusion using a lab-quality imaging setup where the images in FIG. 5A-5B illustrate the unmodified result of two thermal images, one with a thermal residual (FIG. 5A) where the arm was placed prior to movement, and one where the system can identify the heat distribution through other materials (FIG. 5B) and FIGS. 5C-5D demonstrate the clarity and visual fidelity of the resulting DT images that remove ambiguity and drastically improve surface detail.
Figure 5B:
Figure 5C:
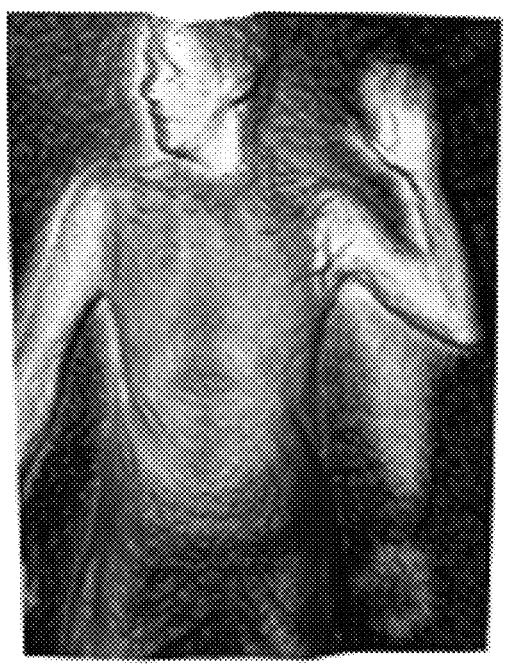
Figure 5D:
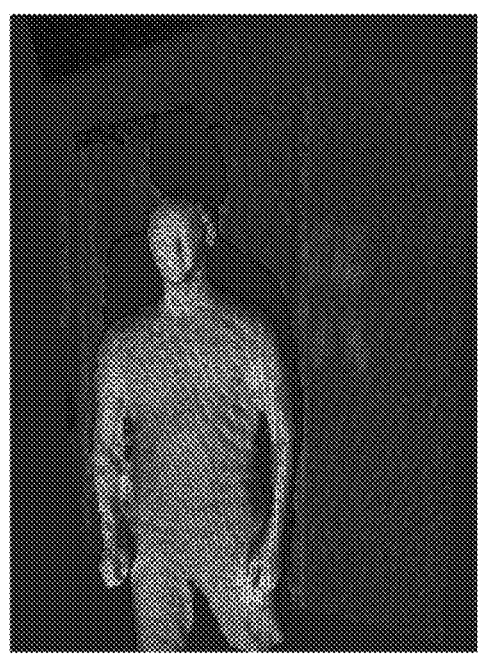

FIGS. 5A-5D illustrates an example of preliminary results of the DT fusion using a lab-quality imaging setup where the images in FIG. 5A-5B illustrate the unmodified result of two thermal images. FIG. 5A shows a thermal residual where the arm was placed prior to movement. In FIG. 5B shows how the system can identify the heat distribution through other materials. FIGS. 5C-5D demonstrate the clarity and visual fidelity of the resulting DT images that remove ambiguity and drastically improve surface detail.

Figure 6:
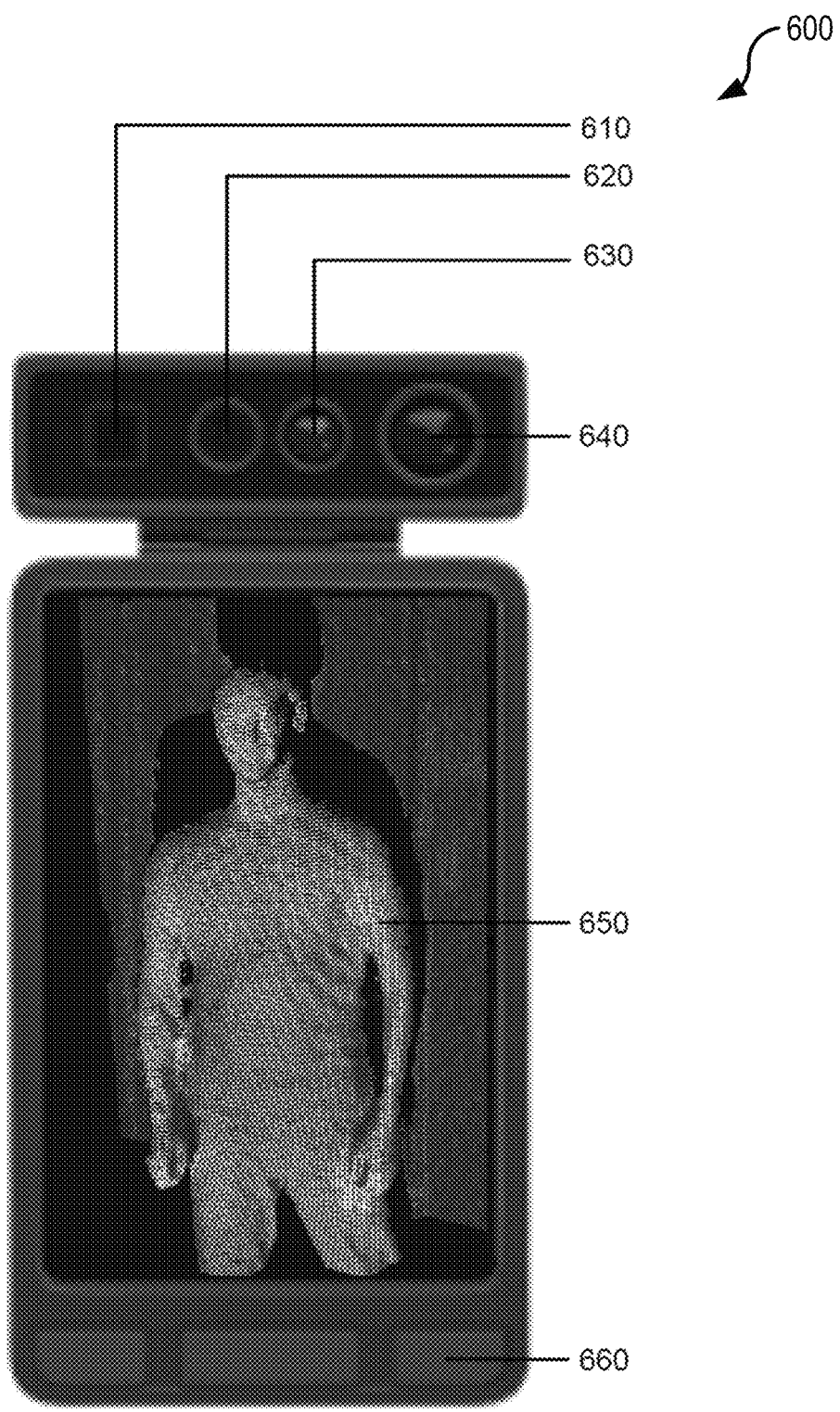
FIG. 6 illustrates the design and form factor of the mobile device that includes: thermal, visible light (RGB), and depth transmitter and sensor (D-Tx, D-Rx) required for the fusion and generation of 3D thermal point-clouds that may be used in one or more embodiments of the present technology.

The combination of these devices demonstrates the potential of depth and thermal fusion. The embodiments illustrated in FIG. 3B provides a static deployable system that a first responder could place at a location of the scene. However, some embodiments also provide a mobile solution with a form factor suitable to be worn as a body camera or used as a hand-held device as illustrated in FIG. 6. The result of the depth-thermal fusion provides a clear, unambiguous presentation of thermal distributions over a 3D surface as shown in FIG. 6. This not only improves clarity but can also provide detailed thermal information about residual heat, dissipation of thermal signatures through other surfaces and materials, and provides an accurate method for extracting previously unobtainable spatial to thermal relationships. Additionally, heat residuals due to contact can lead to misleading ambiguities within thermal-only imaging.

The DT fusion effectively removes the ambiguity of the thermal-only image, greatly improves surface detail, and provides a higher level of visual clarity that can only be obtained through this process. Initial results show exceptional promise with respect to the image quality and additional characteristics that can be extracted directly from the fused data. Various embodiments provide a high-quality DT fusion with a robust and computationally inexpensive alignment process that can be used and deployed.

FIG. 6 illustrates an example of a design and form factor of a mobile device 600. As illustrated in the embodiments shown in FIG. 6, mobile device 600 can include depth transmitter and sensor (D-Tx 610, D-Rx 620), visible light (RGB) camera 630, thermal sensor 640, interactive display 650 (e.g., a touchscreen LCD display), and quick buttons 660 for starting, stopping, and/or pausing the data collection. While FIG. 6 illustrates a four-sensor design, other embodiments may include additional and/or fewer sensors. In addition, the microcontroller, depth sensor 610 and 620, RGB camera 630, thermal sensor 640, and display screen 650 can be developed into a mobile depth-thermal fusion device as shown in FIG. 6. The implementation of this device can be obtained from 3D printing a case similar to the form factor presented, integrating a touch-screen, and the four imaging sensors. The removable camera array (shown in FIG. 6) may be a wire attached removable sensor array that allows the user to scan areas of interest, provides additional flexibility in the use of the device, and can provide close-up views to record accurate surface reconstructions or temperature measurements.

Some embodiments integrate mobile compute platforms for data collection, processing, transfer, and visualization. Small thermal sensors 640 (e.g., FLIR Lepton) and any commercially available depth sensor 610, 620 (e.g., Texas Instruments OPT8241 or the Structure mobile 3D sensor), as well as a small-scale LCD touch-screen 650 for user interaction and control. These cameras and sensors can be used to collect the data needed for the fusion and generation of 3D thermal point-clouds that may be used in one or more embodiments of the present technology.

To solve the underdetermined problem of performing real-time alignments within the device, some embodiments may incorporate sensors for tracking both positional movements and orientation changes over time using an Inertial Measurement Unit (IMU). Some embodiments of device 600 may also have a wireless connection to a host for secure data transfer. Due to the maturity of these sensing devices, the power consumption of the individual sensors required for fusing depth and thermal imaging have been minimized to the point where the device can utilize existing interchangeable power sources (e.g., rechargeable batteries, solar panels, etc.).

Both the mobile wearable DT body-cam (as illustrated in FIG. 6) and an independent tripod-mounted DT imaging device (e.g., in FIG. 3B) can be used for high-resolution scene reconstruction. For both of these devices, the primary development revolves around two factors: (1) the accurate fusion of thermal and depth data, and (2) the efficient wireless communication of the devices.

Figure 7A:
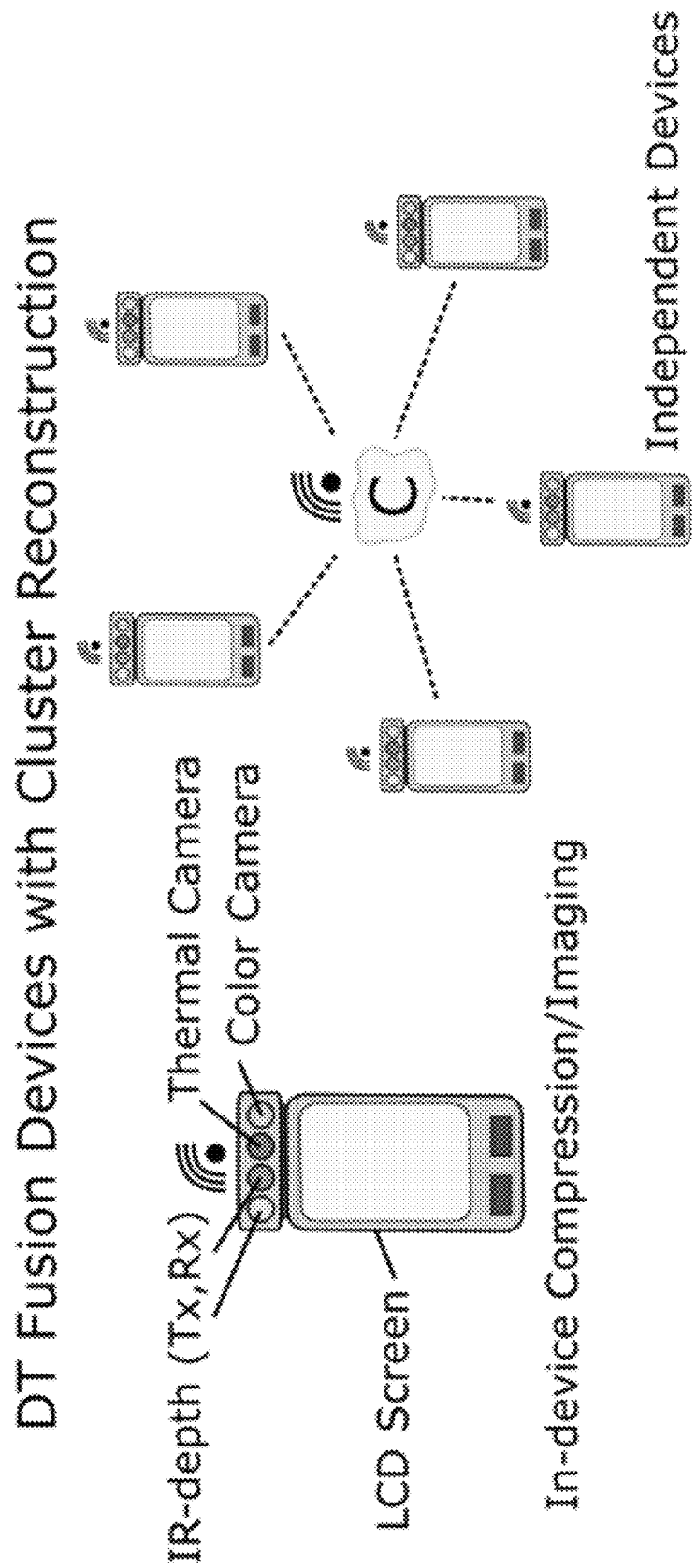
FIG. 7A illustrates a mobile device with an adjustable mount for the imaging devices that can be used to collect data that can be wirelessly transferred to a centralized server in accordance with some embodiments of the present technology.

FIG. 7A illustrates a mobile device with an adjustable mount for the imaging devices that can be used to collect data that can be wirelessly transferred to a centralized server in accordance with some embodiments of the present technology. The mobile device (left) provides an adjustable mount for the imaging devices that can be used to collect data that can be wirelessly transferred to a centralized server. This allows multiple devices to collect and transmit data to provide parallel evidence acquisition over larger coverage areas using multiple devices (1, 2) shown in the floor plan in FIG. 7B.

Figure 7B:
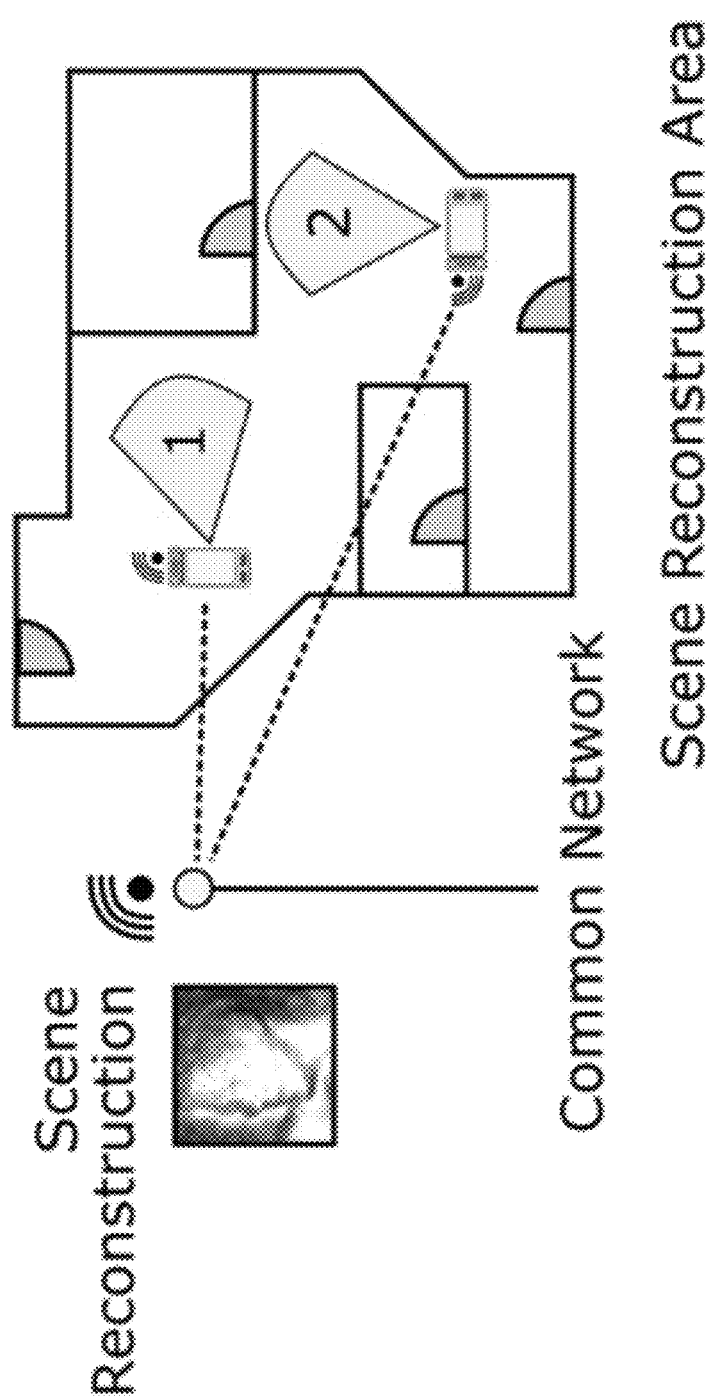
FIG. 7B illustrates an example of multiple devices collecting and transmitting data to provide parallel evidence acquisition over larger coverage areas in accordance with various embodiments of the present technology.

FIG. 7B illustrates an example of multiple devices collecting and transmitting data to provide parallel evidence acquisition over larger coverage areas in accordance with various embodiments of the present technology. Imaging devices on mobile phones provide advanced communication with the ability to effectively transfer data to a central forensic repository. Additionally, since data acquisition with depth-thermal devices require large amounts of bandwidth (3D visual crime scene data), various embodiments integrate a hybrid storage solution that utilizes both localized storage and wireless communications to transmit relevant data for crime scene analysis.

This wireless solution allows us to efficiently collect high-resolution data at the scene, compress it on the mobile device, and transmit relevant information for higher-level feature extraction and evidence analysis. Additionally, some embodiments broaden the data collection to multiple devices worn by multiple people investigating the scene. In the images shown in FIG. 8, the mobile device and its communication to a centralized remote server are illustrated along with how multiple investigators can use the devices to efficiently record forensic scenes in parallel, using multiple devices.

Figure 8:
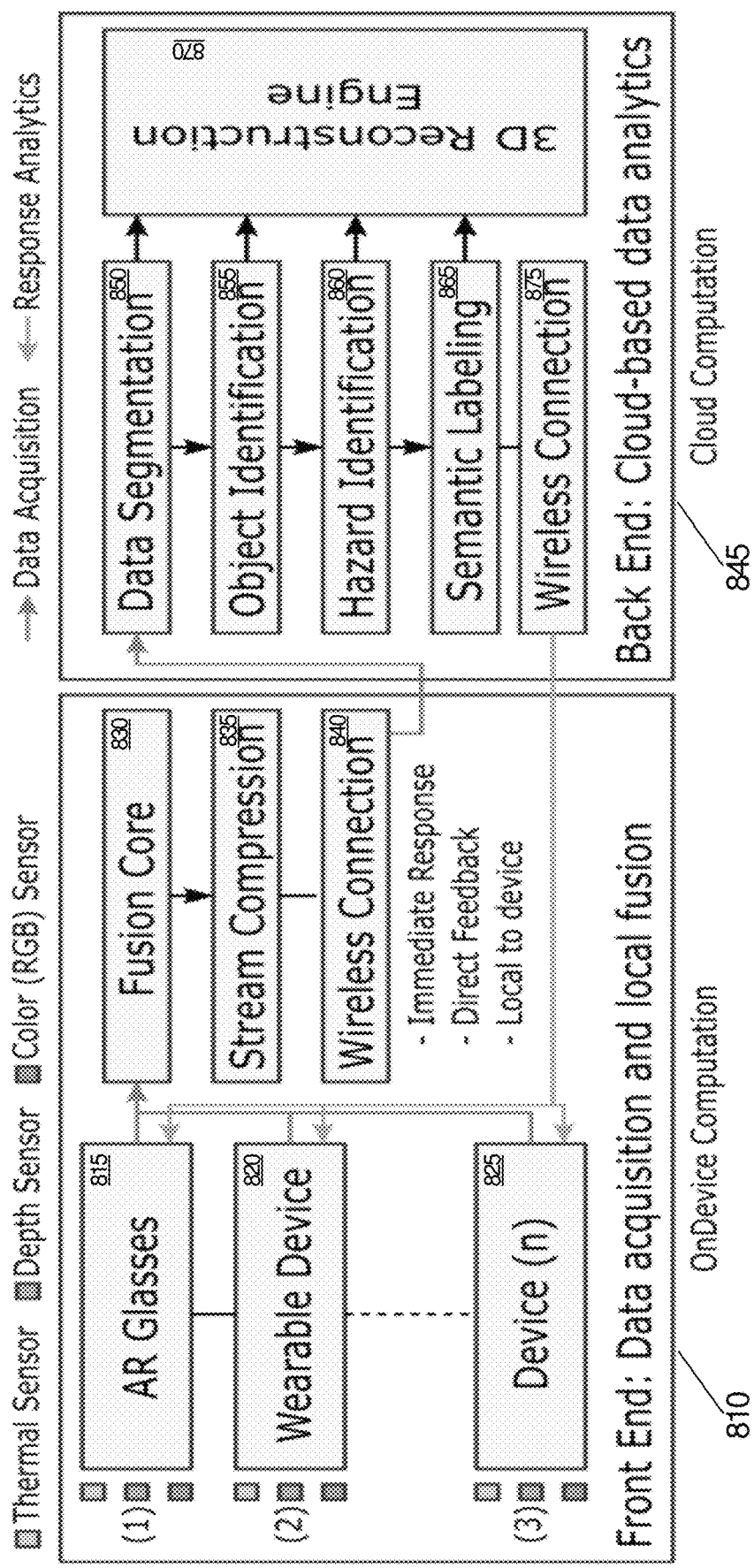
FIG. 8 illustrates an example of a front-end and back-end architecture that spans the mobile devices and cloud-computing servers used for data analytics that may be used in one or more embodiments of the present technology.

FIG. 8 illustrates an example of a front-end 810 and back-end 845 architecture that spans the mobile devices and cloud-computing servers used for data analytics that may be used in one or more embodiments of the present technology. The two-tier architecture illustrated in FIG. 8, can include an evidence, monitoring, surveillance and recognition tier and an evidence cross-referencing and data-analytics tier, to automate forensic scene and surveillance data analysis based on the evolving fused DT data collected from DT-scan mobile devices.

As illustrated in FIG. 8, the front-end acquisition system 810 may include augmented reality glasses 815, wearable devices 820, and/or other devices 825 with different form factors and deployment modes (e.g., drone, robot, etc.). These devices can communicate with a local fusion core 830 which can fuse the images. Stream compression module 835 can compress the data and use wireless connection 840 to connect the front end data acquisition system 810 to cloud-based back-end 845. Back-end 845 can include data segmentation module 850 to segment the data, object identification engine 855 to identify objects, a hazard identification engine 860 to identify hazards, semantic labeling engine 865 to label objects and/or people within the captured environment. A 3D reconstruction engine 870 can ingest the output from each of these modules or engines and generate a 3D reconstruction or map of the local environment provide contextual information (e.g., hazard identifications, semantic labeling, etc.). The 3D reconstruction or map of the local environment can be transmitted back to the devices 815-825 using wireless connection 875.

Some embodiments differ from existing solutions by 1) addressing the complexities of detecting and recognizing evidence from DT data, at the evidence detection and recognition tier deep learning methods can be used that can outperform other solutions in terms of accuracy, and 2) by managing the volume and velocity of the evidence data collected from potentially numerous DT-scan mobile devices, at the evidence cross-referencing tier a variety big data storage and querying methodologies can be used enable scalable cross-referencing of the spatiotemporal DT evidence data.

DT fused data can provide an accurate recording of both spatial details and thermal signatures that can be identified through off-site analysis using deep learning methods. This includes the ability to identify objects within a scene and drastically reduce the error rate of object identification due to the supplementary heat signatures observed from each object. This allows the class of objects in the identification process to be pruned to a smaller subset, reducing the chances of a misclassification. The accurate alignment of the modalities provides critical information about the state of numerous different types of objects and their state. Examples include heat signatures of living beings, the dissipation of body heat which can aid in determining time of death, and even vital information.

The problem of detecting and recognizing evidence (e.g., DT bullet impression and pattern/trace evidence, DT facial identity of suspect, DT signature of a homicide weapon) from evolving DT data is a pattern classification problem that is not well suited to on-device computation. Recently deep learning has been shown to significantly outperform other methodologies in various pattern classification applications, such as activity detection, scene labeling, image captioning, and object detection that can be well adapted to the cloud-computing resources that are established on some embodiments of the backend solution. These methodologies can be integrated into the cloud computing resources to provide adequate computational power to process the incoming streams of data from the in-field devices through wireless communication channels that can then be forwarded back to mobile devices within the field.

To adapt some embodiments to this paradigm, the separation of the front-end, and back-end computations form the foundation of the system architecture. Some embodiments use an efficient wireless communication pathway between the (n) interchangeable devices with the backend system. For the mobile device, the computation includes the process of fusing the thermal, depth, and color input streams, compressing the data, and transmitting the streams to backend servers. Multiple devices can perform this process simultaneously and the backend is responsible for integrating the data and performing the reconstruction of the environment in which the field devices reside.

This acquisition process provides several input streams that are transferred to the backend where data segmentation, object and hazard identification are performed. This includes the generation of recognized object labels, commonly reoccurring patterns in both static objects such as placement and hazardous properties and dynamic objects such as other individuals. The primary objective of the backend computations is to provide useful semantic labels and data patterns to the users within the field. Once the semantic data processing is complete for the current scan region, the responses from the backend are then transferred to each of the mobile devices to provide feedback based on the semantic labeling of the scene from the ML-driven analytics. The overview of the two-layer architecture is shown in FIG. 8.

This architecture allows for two important contributions: (1) immediate feedback for in the field devices that require quick identification of pertinent forensic or surveillance data such as key evidence or hazards and (2) backend communication with cloud-based data analytics that provides critical contextual information about the current scene and a complete reconstruction of the environment as the information is processed. This provides critical semantic labeling and information to frontend users and also provides an automated documentation process that can store the 3D reconstruction of the scene.

Various embodiments may be used as a surveillance system for automated detection of criminal activities from multi-source sensor data. These embodiments typically include two main tiers: (1) an event detection and recognition tier that analyzes the input sensor data in real-time to automatically identify, tag in time and space, and store events of interest (ex. sound of a gunshot from sound sensor data and picture of a speeding car from surveillance video data), and (2) a spatiotemporal cross-referencing tier that enables efficient assembly of the recognized and stored events over time to connect-the-dots and identify criminal activities.

Figure 9:
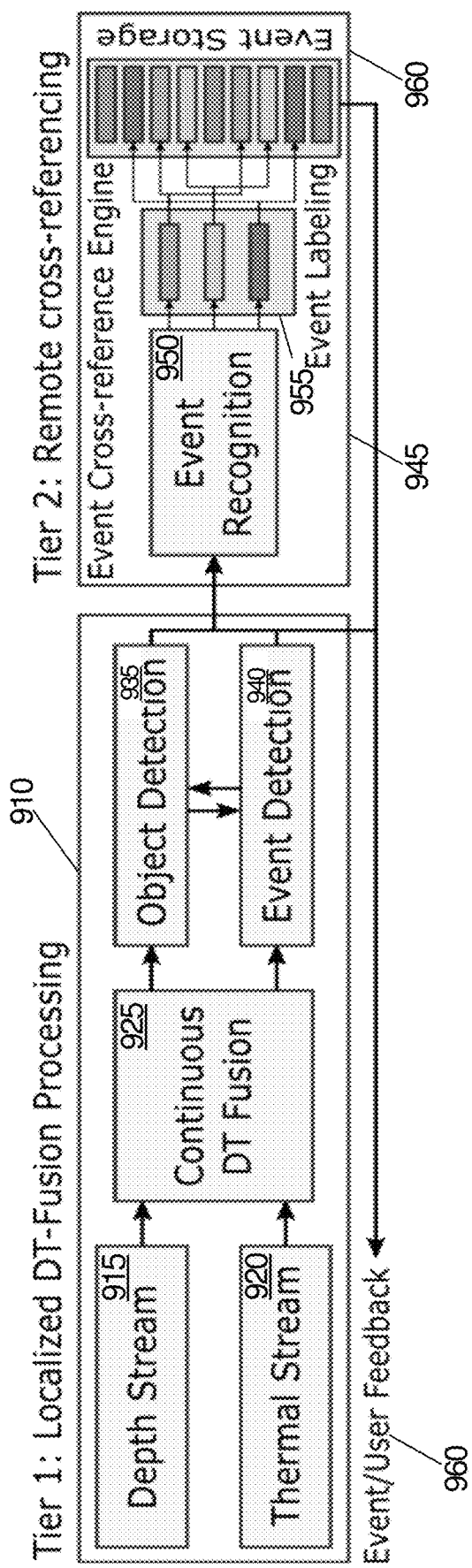
FIG. 9 illustrates an example of a set of components within a multi-tier architecture that may be used in accordance with various embodiments of the present technology.

FIG. 9 illustrates an example of a set of components 900 within a multi-tier architecture that may be used in accordance with various embodiments of the present technology. As illustrated in FIG. 9, first tier 910 provides the localized DT-fusion processing. Depth streams 915 and thermal streams 920 (e.g., sequences of images or video) are provided to fusion engine 825 which generates a continuous DT fusion stream (e.g., a sequence of fused images). The DT fusion stream can be fed into an object detection engine 935 and event detection engine 940 which analyze the DT fusion stream content to detect objects and events. The object and event output can be sent to remote cross-referencing tier 945 where event recognition engine 950 can generate labels 955. The event labels can be stored in memory store 960 and transmitted back to (or accessed by) local devices for user feedback 960 and integration into decision making.

Figure 10:
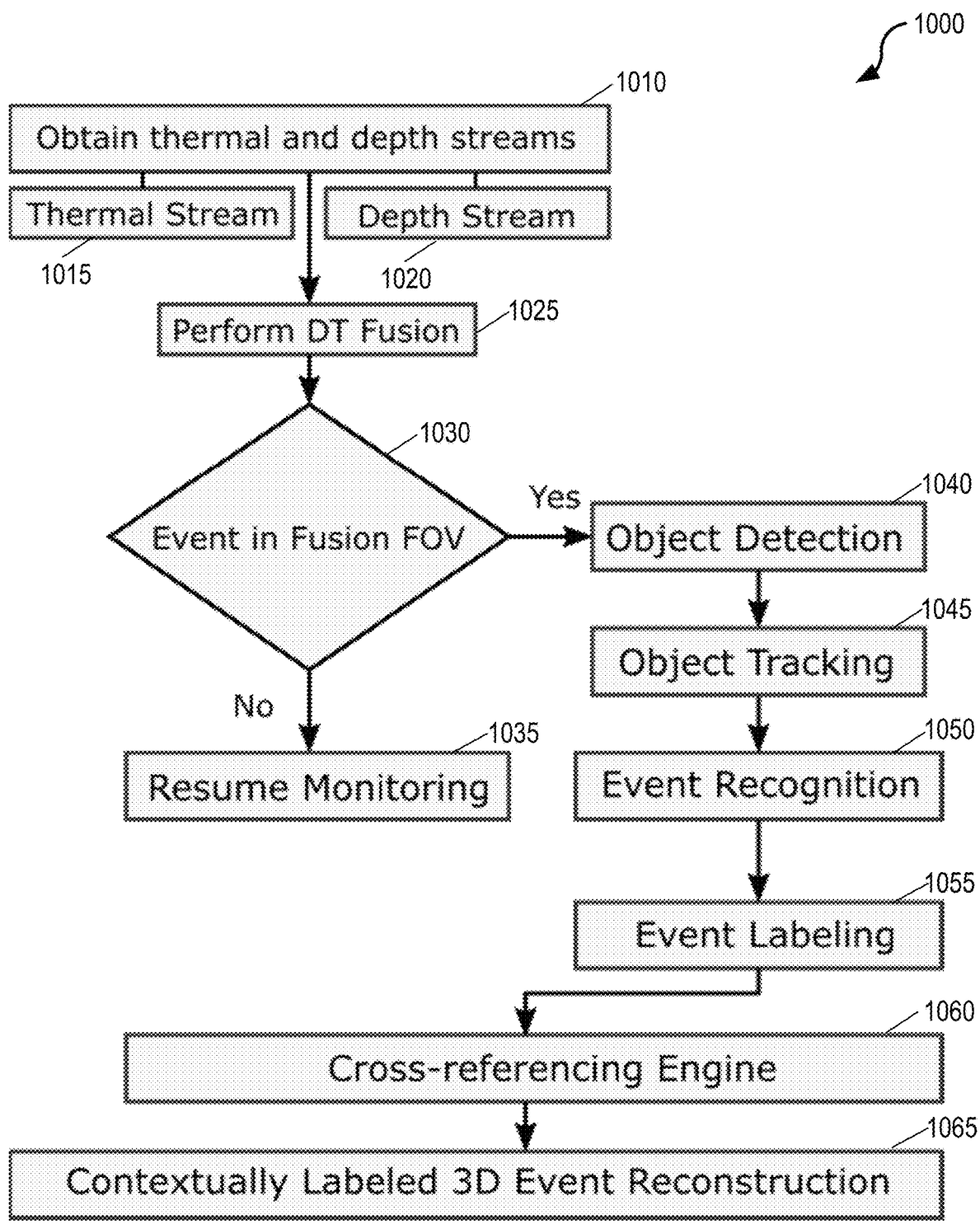
FIG. 10 is a flowchart illustrating an example of a set of operations that may be performed for contextually labeling 3D even reconstructions in some embodiments of the present technology.

FIG. 10 is a flowchart illustrating an example of a set of operations 1000 that may be performed for contextually labeling 3D event reconstructions in some embodiments of the present technology. In the embodiments illustrated in FIG. 10, operation 1010 obtains thermal stream 1015 and depth stream 1020. Local devices may be constantly capturing images, video, and/or other sensor data of a local environment (e.g., within a building, a parking lot, etc.). These streams of data may be stored locally on the devices and/or within a local or cloud-based storage platform. These streams can be accessed in real-time from local devices (e.g., by a fusion service). In some cases, the devices may be pushing the streams in real-time or in batches to the local and/or cloud-based system. In other cases, a supervisory system may be monitoring the location of devices and requesting streams needed for processing.

During fusion operation 1025 the streams are fused and event determination operation 1030 monitors for events. When event determination operation 1030 determines that no events are present, event determination operation 1030 branches to resume operation 1035 where the monitoring of the local environment is resumed. When event determination operation 1030 determines that an event is present, event determination operation 1030 branches to object detection operation 1040 where any objects are detected and tracked using object tracking operation 1045. Event recognition operation 1050 can be used to identify the event and labeling can be generated by labeling operation 1055. Using this information cross-referencing engine 1060 can cross-reference the event with other recorded events. Reconstruction operation 1065 can then generate contextually labeled 3D event reconstructions.

In order to seamlessly integrate traditional forensic methods with new comprehensive imaging technique, various embodiments augment current investigation procedures through the introduction of a transparent evidence collection analysis toolset. Through this augmentation, the gap between advanced imaging techniques and existing practical evidence collection methods can be reduced to improve investigation accuracy and provide consistency through automated reconstruction techniques. Some embodiments of the present technology may use a set of quantitative metrics in traditional forensics that can be improved and automated through the use of DT imaging and evaluated in coordination with the National Center of Media Forensics (NCMF). This ensures that meaningful results to current investigation procedures and meet well-established forensic standards.

In addition to accuracy and consistency of the data collection, various embodiments also enable new forms of coordination between police, firefighters, medical personnel, and investigators by providing wireless and collaborative data collection. This introduces a new form of coordinating real-time data streams between multiple agencies to build a single coherent evidence model that can be consolidated and accessed through cloud computing resources.

Towards this multifaceted expansion of evidence collection, some embodiments build on existing documentation methods such as photography, measurements, scene sketching, and physical evidence collection to provide a comprehensive scene reconstruction solution. Building on this contribution, some embodiments identify how new analysis methods, enhanced by DT fusion, can improve important aspects of crime scene analysis such as improved ballistics analysis, DT facial signatures for authentication, and introduce new partial evidence correlation for building models on incomplete datasets through big data analysis and new techniques in machine learning.

Ballistics Analysis

Analysis of destruction and damage to an environment is a critical aspect of ballistics analysis. This analysis provides information about bullet trajectory, explosive localization, and damage patterns that can be traced using DT imaging. These factors may provide information about interactions that drastically alter surfaces and objects within a crime scene, and can assist in reconstructing the unobservable sequence of events. Using DT imaging, these patterns can be quickly obtained during an initial scan and closely analyzed at a later time. Bullet tracings, holes and other damage incurred by projectiles can be accurately recorded within surfaces and objects in the scene.

Based on the arrival time of first-responders, this can provide valuable thermal information based on the temperature dissipation of different materials. Similarly, in the instance of explosive localization, debris patterns and impact damages detected in 3D can give a much more precise estimation of how the damage was incurred. This is because within the reconstruction, measurements can be directly assessed using the 3D model.

Figure 11:
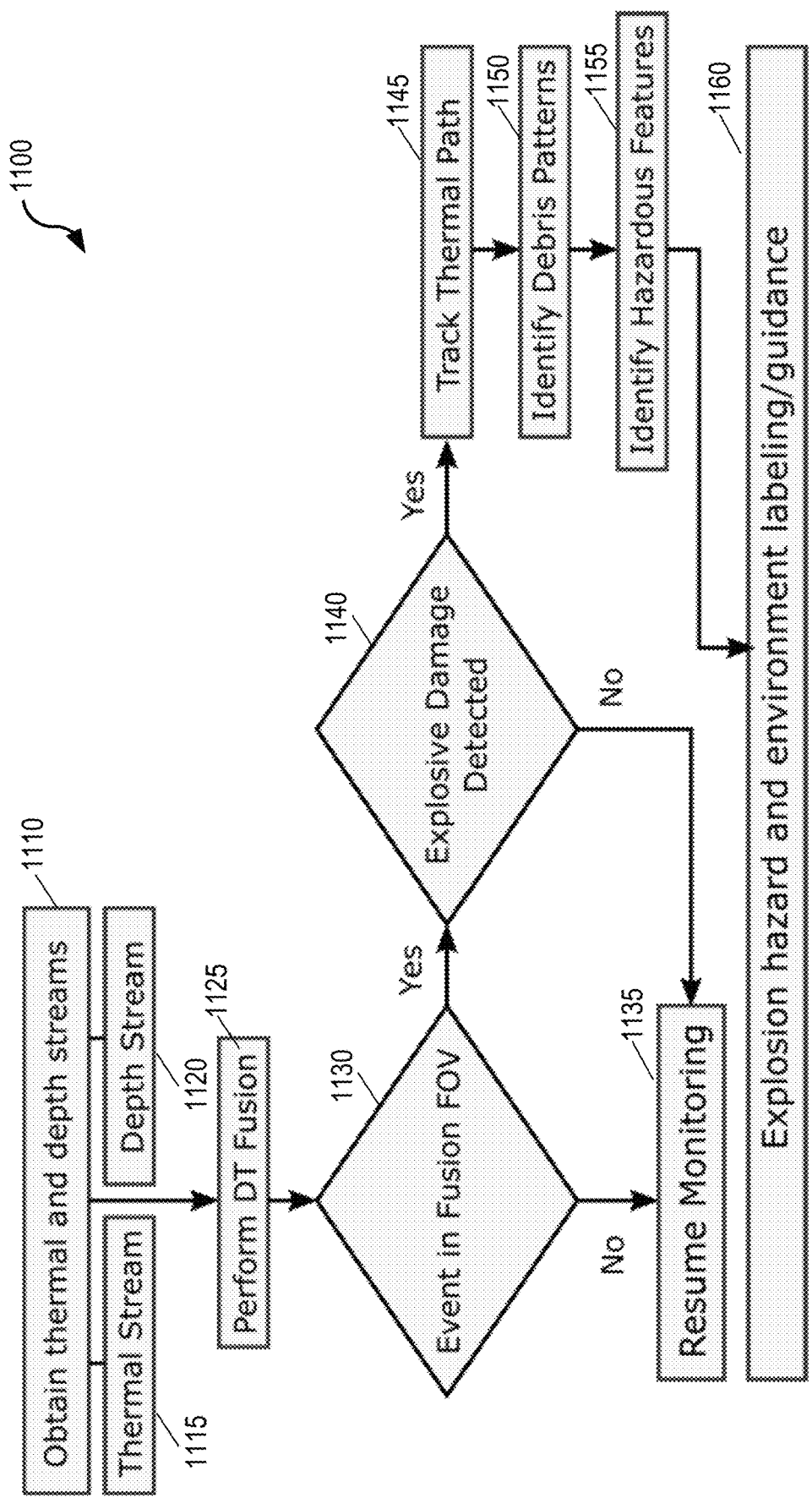
FIG. 11 is a flowchart illustrating an example of a set of operations for explosion and hazard labeling in accordance with one or more embodiments of the present technology.

FIG. 11 is a flowchart illustrating an example of a set of operations 1100 for explosion and hazard labeling in accordance with one or more embodiments of the present technology. In the embodiments illustrated in FIG. 11, operation 1110 obtains thermal stream 1115 and depth stream 1120. Local devices may be constantly capturing images, video, and/or other sensor data of a local environment (e.g., within a building, a parking lot, etc.). These streams of data may be stored locally on the devices and/or within a local or cloud-based storage platform. These streams can be accessed in real-time from local devices (e.g., by a fusion service). In some cases, the devices may be pushing the streams in real-time or in batches to the local and/or cloud-based system. In other cases, a supervisory system may be monitoring the location of devices and requesting streams needed for processing.

During fusion operation 1125 the streams can be fused and event determination operation 1130 monitors for events. When event determination operation 1130 determines that no events are present, event determination operation 1130 branches to resume operation 1135 where the monitoring of the local environment is resumed. When event determination operation 1130 determines that an event is present, event determination operation 1130 branches to explosive detection operation 1140. Explosive detection operation 1140 may look for objects of a particular size and/or shape or with particular thermal profiles. In some embodiments, sensor data indicating chemical compositions, materials, and/or other information may also be used by explosive detection operation 1140. When explosive detection operation 1140 determines no explosives are present, then explosive detection operation 1140 branches to resume operation 1135 where the monitoring of the local environment is resumed.

When explosive detection operation 1140 determines one or more explosives are present within the local environment, then explosive detection operation 1140 branches to thermal path tracking 1145 where the path of the identified explosive is tracked and debris identification operation 1150 identifies debris patterns. Hazard identification operation 1155 can identify hazardous features (e.g., unexploded devices) and labeling operation 1160 can generate an explosion hazard and environment labeling.

Figure 12:
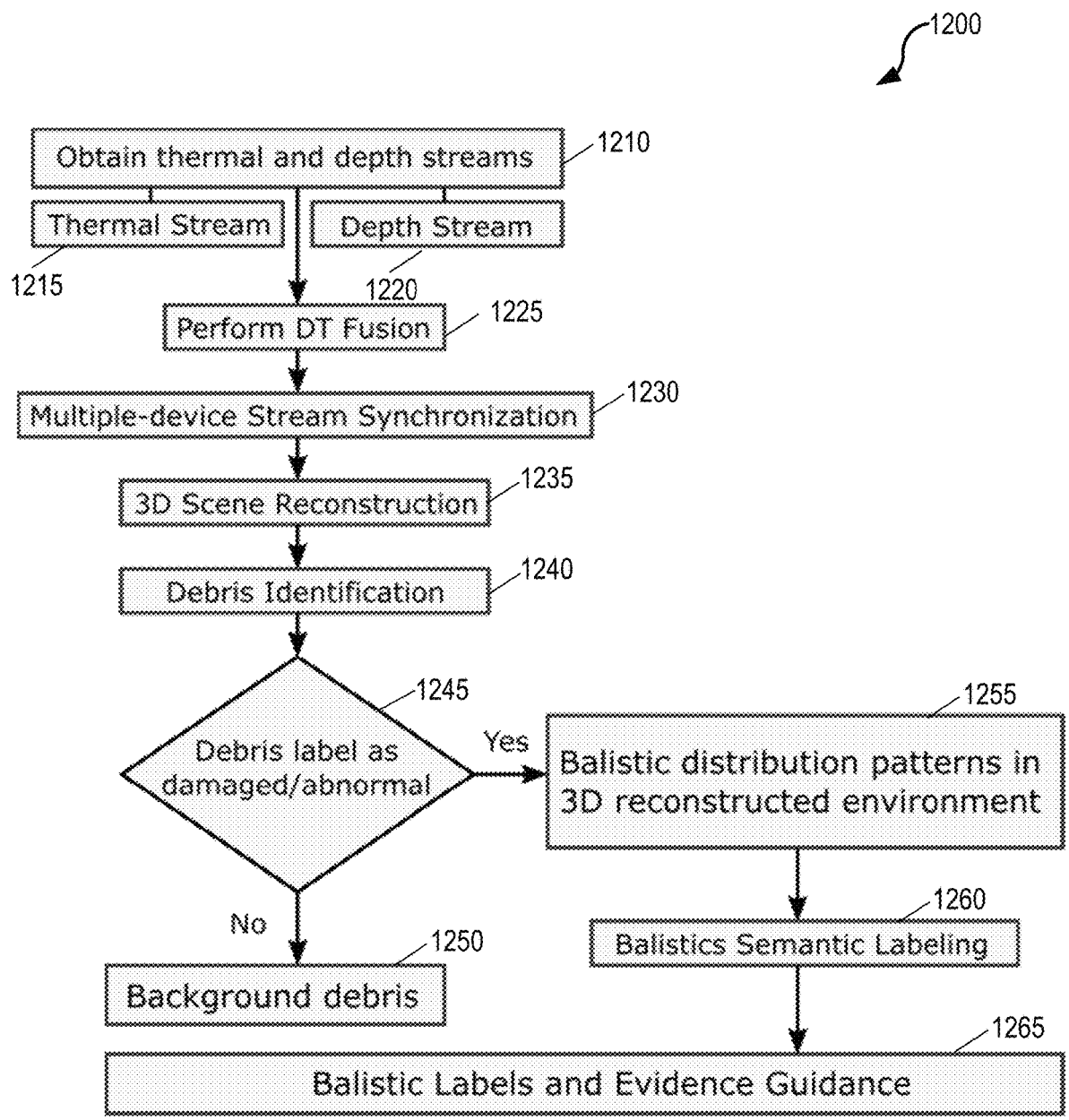
FIG. 12 is a flowchart illustrating an example of a set of operations for ballistic labeling in accordance with various embodiments of the present technology.

FIG. 12 is a flowchart illustrating an example of a set of operations 1200 for ballistic labeling in accordance with various embodiments of the present technology. In the embodiments illustrated in FIG. 12, operation 1210 obtains thermal stream 1215 and depth stream 1220. Local devices may be constantly capturing images, video, and/or other sensor data of a local environment (e.g., within a building, a parking lot, etc.). These streams of data may be stored locally on the devices and/or within a local or cloud-based storage platform. These streams can be accessed in real-time from local devices (e.g., by a fusion service). In some cases, the devices may be pushing the streams in real-time or in batches to the local and/or cloud-based system. In other cases, a supervisory system may be monitoring the location of devices and requesting streams needed for processing.

During fusion operation 1225 the streams can be fused. Synchronization operation 1230 can synchronize multiple device streams allowing reconstruction operation 1230 to reconstruct a 3D scene of the local environment. For example, each image in the stream may be time stamped with a time from a common source. For offline synchronization, each frame within these parallel streams, timestamps are employed to provide an accurate capture time. The disparity between the two streams can be solve on a per-frame basis generated using a closest-neighbor alignment algorithm. This ensures that the closest possible frames capture from each data stream are aligned such that the error between the captured world state is minimized. In the synchronization of these data frames, they are stored as raw representations within memory as an associated array. For real-time streams and interactive feedback interfaces, the stream frames are synchronized based on the latest collected frame shifted to the closest neighbor time-stamp. The latest pair of fused images are then presented as the current sensor state and streamed to the visual interface of the device.

Using the 3D scene reconstruction identification operation 1240 can identify any debris. Determination operation 1245 can analyze the debris to determine whether there is damage or the debris is abnormal based on the surrounding structure and pre-trained model analysis. These models can assist with identifying abnormalities in structure or geometric configuration based on expected architecture or continuities within well-known structure archetypes. When determination operation 1245 determines there is no damage and/or nothing is abnormal, then determination operation 1245 branches to labeling operation 1250 were the debris is labeled as background debris and provided a lower relevance level. When determination operation 1245 determines there is damage and/or some debris is abnormal, then determination operation 1245 branches to distribution operation 1255 where a potential damage or ballistic distribution pattern is identified within the reconstructed environment using the identified damaged or abnormal debris. Labeling operation 1260 provides a semantic labeling of the debris. Examples of this premise are derived from established architectural and structural archetypes of buildings and other structures. This includes continuity of walls, identifying support structures, and assessing abnormalities within the reconstructed data versus pre-trained models that define common characteristics of buildings. For example, this includes structural dependences for overhangs, identifying holes or blast damage within surfaces that match pre-trained patterns of damage. Guidance operation 1265 provides the ballistic labels and evidence guidance overlays to the devices to aid the users.

Depth-Thermal Signatures for Authentication

Figure 13:
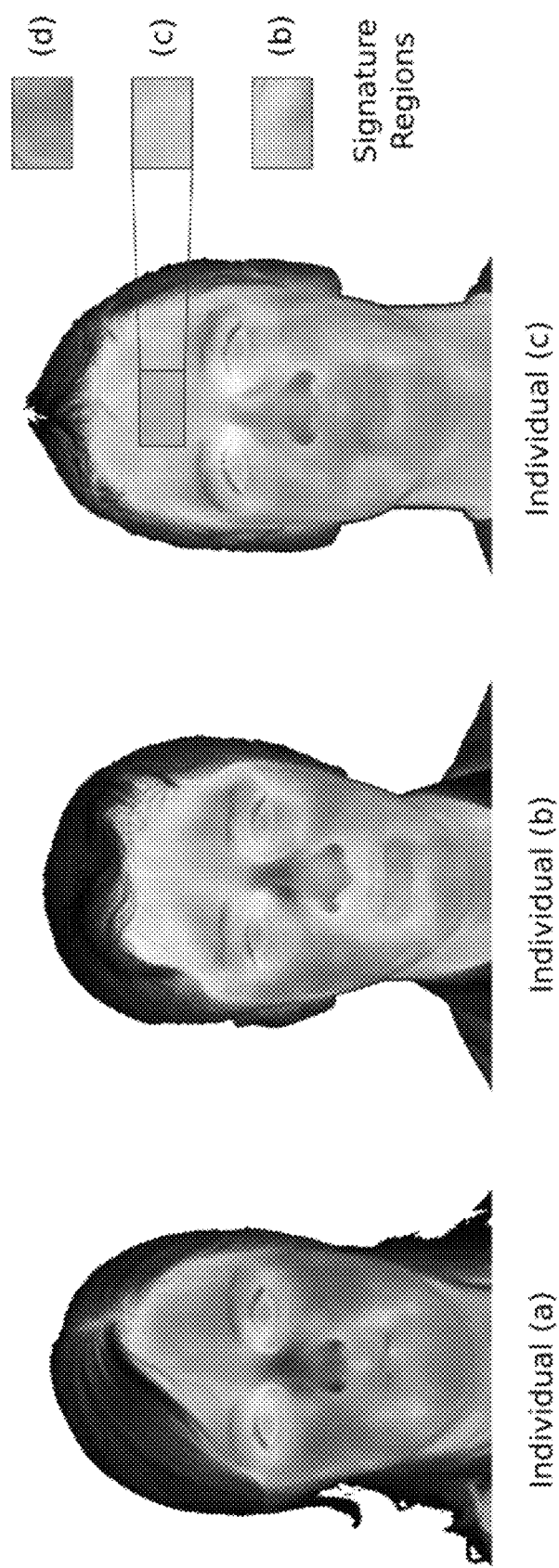
FIG. 13 illustrates an example set of thermal profiles demonstrating the unique thermal signature of multiple individuals which can be used to narrow potential matches that do not have a correlated heat distribution in some embodiments of the present technology.

Facial authentication has been explored in visible and depth images, and preliminary approaches have been proposed for thermal imaging. All of these methods of authentication utilize improvements in machine learning technologies to dramatically improve the accuracy and modalities that can be used for reliable authentication. Various embodiments leverage both the thermal distribution over the surface of an individual's face and its geometric structure to form a unified distribution signature that can be used to uniquely identify an individual. The thermal distribution pattern of each image is highly individualized due to the blood flow through the face, which is dependent upon an individual's vascular structure. The primary thermal features and associated patterns some embodiments can identify within the face remain even when the environment temperature changes or if the individual undergoes physical exertion. The key insight to this approach, shown in FIG. 13, is that these features are extremely hard to replicate, thus strengthening this form of authentication. Additionally, since all regions of the face incorporate a unique thermal signature, various embodiments can utilize signature regions to identify faces that are partially obscured or covered by facial hair, makeup, or other occlusions.

FIG. 13 illustrates an example set of thermal profiles demonstrating the unique thermal signature of multiple individuals which can be used to narrow potential matches that do not have a correlated heat distribution in some embodiments of the present technology. Thermal profiles demonstrating the unique thermal signature of multiple individuals. The thermal signature varies drastically throughout the face due to differences in facial structure and blood flow. Signature regions that define specific characteristics of the thermal distribution can be used to narrow potential matches that do not have a correlated heat distribution.

Since this form of imaging is independent of visible wavelengths, this method does not suffer from inadequate lighting problems that plague current RGB image facial authentication algorithms. Furthermore, because this method of imaging is race independent, meaning that the interrelation between skin color and lighting does not play a factor in this form of authentication, this solution provides an effective solution to an open problem in current RGB face authentication methods.

These contributions are critical to the use of DT facial recognition in the use of both mobile and AR-based devices. This provides the foundation upon which this form of authentication can be employed within several difficult deployment scenarios such as in public areas such as airports and urban environments with uncontrollable lighting conditions. This includes deployment with law enforcement officers and can also be used within a variety of tactical combat situations for military personnel. Specifically, this includes: (1) the ability for officers to use AR-based facial authentication based on thermal and depth imaging in the field, (2) identify important pieces of evidence or potential hazardous objects based on their thermal signature or structural profile, and (3) general surveillance of individuals based on their thermal profiles for risk and threat identification based on interactive data acquisition process that can allow for adaptive feedback based on current observations.

Partial Evidence Reconstruction

Physical trace evidence is defined as partial due to the limited amount of information that can be extracted from direct observations and analysis methods. However, as every physical trace instance belongs to a specific class, such as ballistics analysis, damage patterns, injuries, and other forms of evidence, various embodiments can apply big data analysis methods to cross-correlate evidence to provide evidence completion. This enables us to observe a partial form of evidence, such as damage patterns or bullet trajectories, and extract similar data from a database to complete the partial observation. This will provide an important new tool for evaluating limited trace evidence using evidence databases.

Usability Study/Use Case Development

The broader applicability of the core fusion method used in various embodiments can be realized through the integration of this technique with existing forensic, hazardous environment mapping, and disaster relief guidance methodologies. Various embodiments of the present technology are applicable to different use cases use cases. Some of the potential factors that will impact the usability and feasibility of the device in field deployment are discussed below. This will also allow for evaluating the core functionality of various algorithms and the operational use of mobile solutions within realistic investigation reconstructions. These experiments will assess both quantitative and qualitative measures to ensure that valid contributions to investigative analysis are obtained through these techniques. This section introduces a prominent set of usability and use cases that will be established to measure deployment feasibility and potential impacts on forensic science.

3D crime scene reconstruction: Analysis of the effort required to map interior rooms, coverage levels, time requirements, and reliability of the reconstruction process. These metrics will then be minimized to address real-world scenarios for evidence collection.

Parallel cooperative evidence collection: Evaluation of how multiple investigators can collaborate to quickly map and reconstruct a crime scene. This novel contribution has critical implications for using the developed sensor network with a variety of cooperating agencies to coordinate and enable efficient evidence acquisition.

Evidence collection in visually obscured conditions: Hazardous conditions or scenarios that introduce uncontrollable visual occlusions can interfere with investigations or complicate the process of collecting data. Various embodiments aim to aid first responders with the ability to see 3D structures and temperature measurements for safety concerns using various embodiments of the DT devices.

Cross-correlational evidence identification: Incomplete evidence and commonly recurring physical traces can be extracted from DT database reconstructions to identify potentially relevant evidence in linked crime scenes. This is examined using existing object tracking and damage analysis methods to link specific types of related crimes through machine learning.

Augmented Reality

This work improves multi-modal imaging forensics through deep learning algorithms that can incrementally improve how some embodiments analyze, model, and link crime scenes. Some embodiments have the potential to significantly ease the difficulty of crime scene visual evidence collection, allowing first responders and investigators to record pertinent evidence without detracting from their numerous other responsibilities. Additionally, these solutions will enable a broad expansion in types of information that can be automatically collected and used within forensic scene reconstruction. Wireless communication enables some embodiments of the DT scanning device to communicate with remote servers for collaboration with other investigators, post-processing, and data storage. Furthermore, these small, portable devices could be used by multiple investigators at the same crime scene in order to collaboratively record and reconstruct the scene in parallel using dynamic integration of 3D images.

In addition to these contributions to forensic science, some embodiments also aim to investigate how some embodiments can be used with emerging technologies including Augmented Reality (AR) and Virtual Reality (VR) to provide real-time AR imaging for first responders for hazard, safety, and disaster applications and VR training for evidence collection and crime scene analysis.

Augmented Reality Device and Data Acquisition

The continuous stream of depth-thermal fused images can be superimposed on an augmented reality (AR) screen to provide real-time information about the environment around a first responder or other investigators. This form of AR can be extended to incorporate scene reconstruction for complex environments that are difficult to manually document or that may be limited in clarity for normal vision and prohibit normal scene analysis procedures. The fusion, displayed on the visor of an AR device, will enable safer environment traversal and hazard identification in addition to evidence collection.

FIG. 13 shows the 3D design of the AR device that integrates depth, thermal, and RGB cameras into a single device, similar to some embodiments of the mobile solution. This device could provide live streams of the DT fused data in an overlay that can be used to improve environment navigation, improve safety due to hazards, and provide first responders with a thermal overlay that could assist in authentication and human figure recognition.

The device provides a head-mounted vision overlay that displays the real-time stream of the depth and thermal fused data. This allows for immediate feedback from the local device computations based on the fused images. The fused image data is then compressed and transmitted over a wireless communication channel for backend processing. From the backend processing in the remote cloud sever, semantic labeling, and identifies hazard types that may not be immediately identifiable within the scene through the naked eye or with the device. The integrated thermal and depth cloud is provided as a projection in the view of the augmented reality glasses as shown in FIG. 14B or can optionally be redirected to the mobile device for a traditional LCD screen display.

Figure 14A:
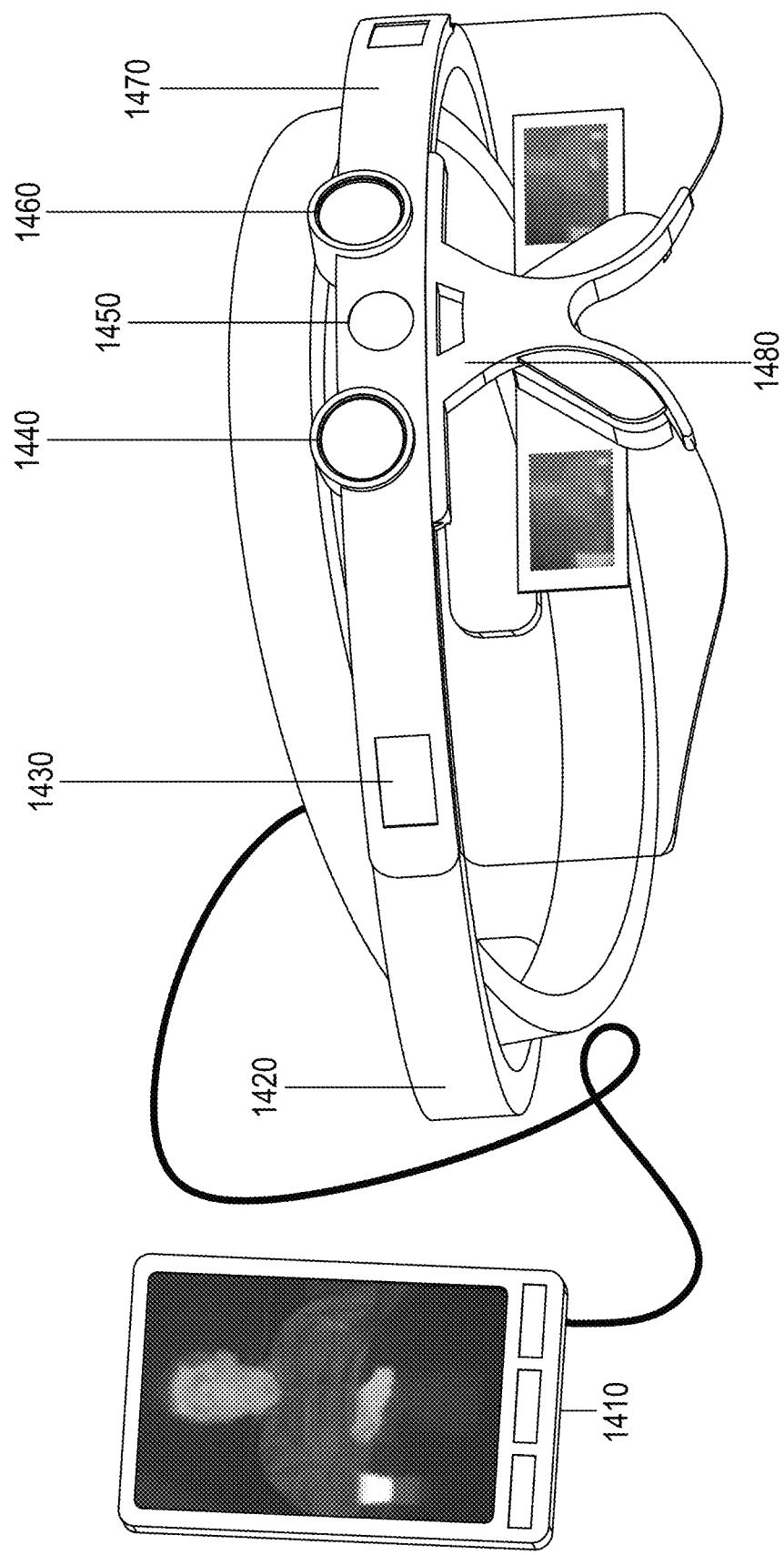
FIGS. 14A-14B illustrates examples of a device that can enable for AR-DT allowing first-responders to not only record DT images in real-time, but also allow them to view their surrounding environment as 3D thermal scans in one or more embodiments of the present technology.
Figure 14B:
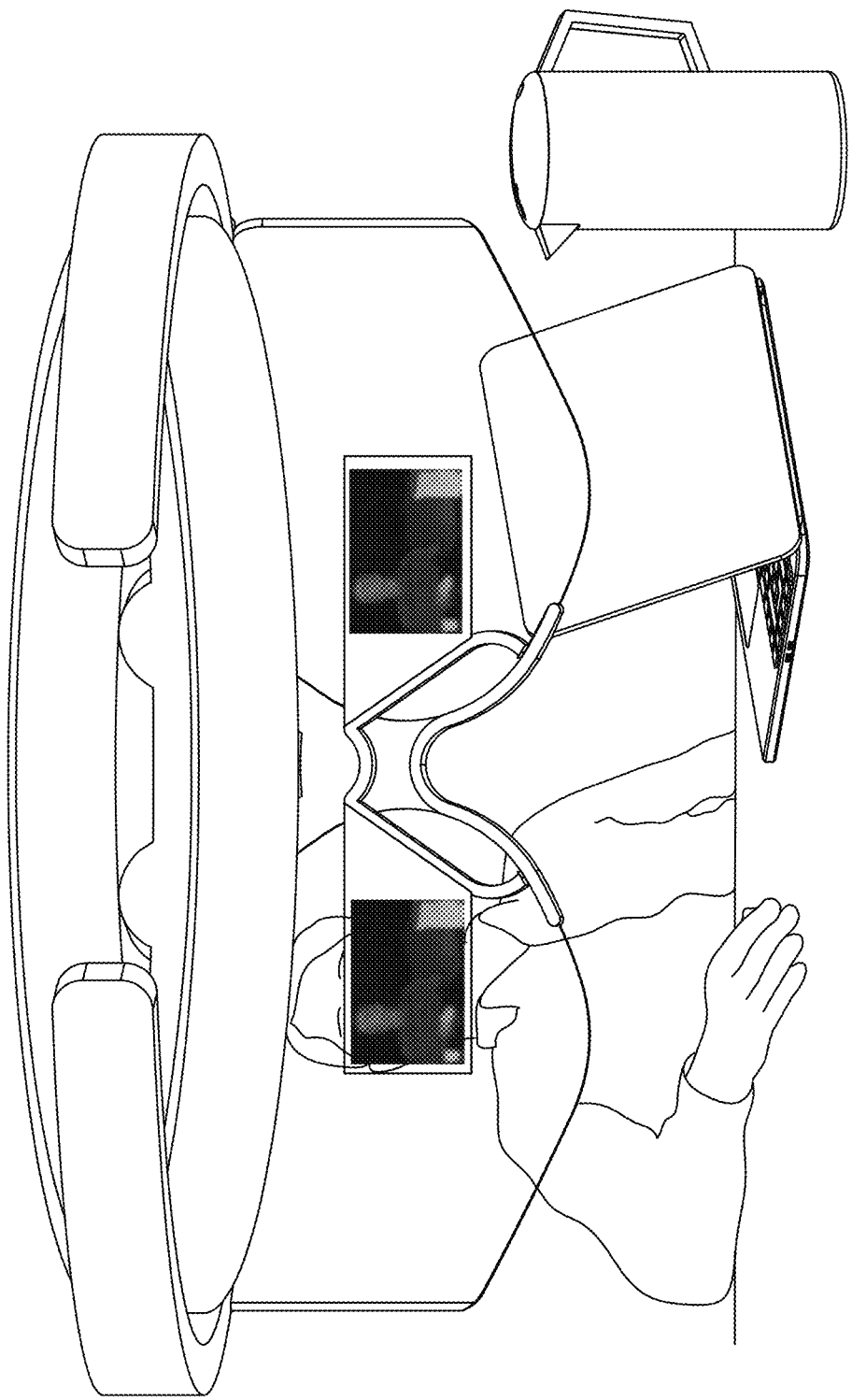

FIGS. 14A-14B illustrates examples of a device that can enable for AR-DT allowing first-responders to not only record DT images in real-time, but also allow them to view their surrounding environment as 3D thermal scans in one or more embodiments of the present technology. From the recorded data, various embodiments can facilitate analysis of the crime scene in virtual reality (VR) as a replacement for manual sketch preparation. This allows users to move through the scene freely to investigate regions of interest using VR, and allows the scene to be analyzed from any perspective with the user's natural freedom of movement. This can provide an intuitive method of visualizing and analyzing existing crime scenes after they have been recorded. This can be used to make new observations, annotations, and discoveries can be made by closely examining the 3D reconstruction of the scene, even after the original evidence has been removed, even by other investigators that were not originally at the scene when the evidence was collected. Additionally, VR can be used as a tool for training new investigators how to collect evidence based on real reconstructed crime scenes.

Urban Surveillance and Public
Safety—Long-Distance Sensing Fusion

Depth imaging typically has a limited sensing range due to the strength of the emitted signal and the atmospheric interference that degrades time-of-flight measurements for long distances. Therefore, surveillance systems that utilize depth imaging have yet to become prominent for large outdoor and urban environments due to the large depth errors that make the method prone to inaccurate measurements. However, with the introduction of long-range and drone-based LIDAR systems, signal accuracy at long distances is now feasible for new developments in large interior spaces and expansive outdoor urban surveillance.

Introducing depth to long-distance thermal surveillance provides a foundation for correctly interpreting complex scenes and environments. Surveillance through video streams commonly suffers from several reoccurring and common problems: (1) visual occlusion, (2) spatial ambiguity, and (3) object and context identification for action recognition and even tracing. While single view imaging devices cannot solve visual occlusions alone, depth imaging can assist in deciphering spatial context of visual occlusions and automatically resolve ambiguity. Unlike color images, thermal images provide limited distinctions between hard edges and uniform surfaces of the same temperature. This can lead to large portions of the environment captured by a thermal camera as lost detail. This unknown environment detail is due to the uniform temperature of the scene leading to a loss in edge and detail information. Since thermal imaging is utilized to provide a vast array of benefits on top of traditional color images, important spatial context such as objects and edges have to be correctly identified. Based on the explicit detection of edges and scene detail, depth imaging provides an ideal solution to these problems. To identify the impact of depth imaging on identifying environmental and spatial context of the events recorded trough a thermal camera, the thermal images are compared directly to the fused depth and thermal point-clouds in FIG. 15. This illustrates how spatial ambiguity, visual occlusions, and a great deal of semantic information can be obtained through the fusion of these imaging modalities.

Figure 15A:
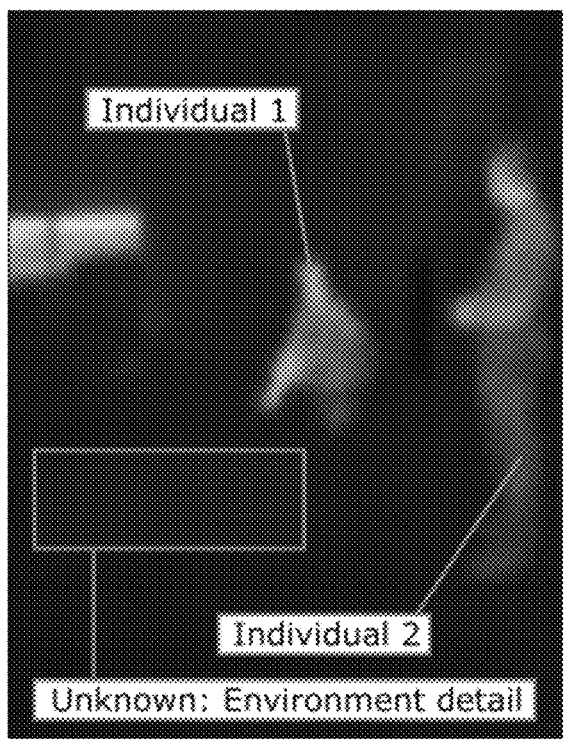
FIGS. 15A-15D provide an example of how fused thermal and depth imaging techniques provide improved detail and contextual information for real-time surveillance in various embodiments of the present technology.
Figure 15B:
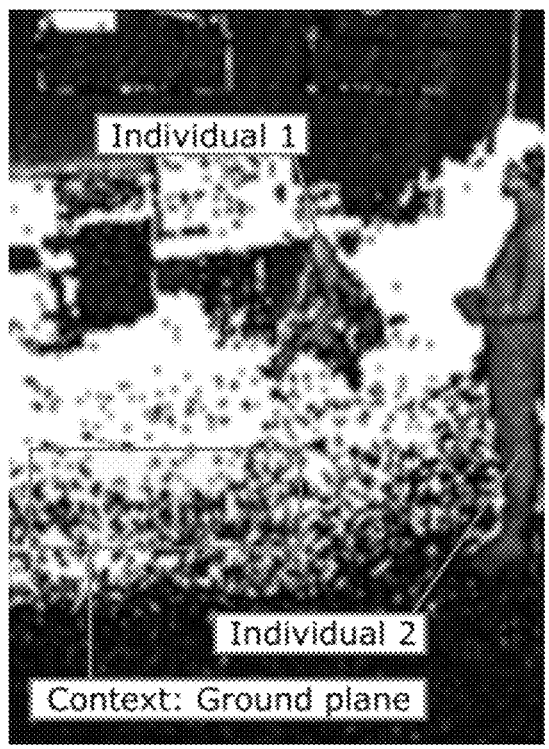
Figure 15C:
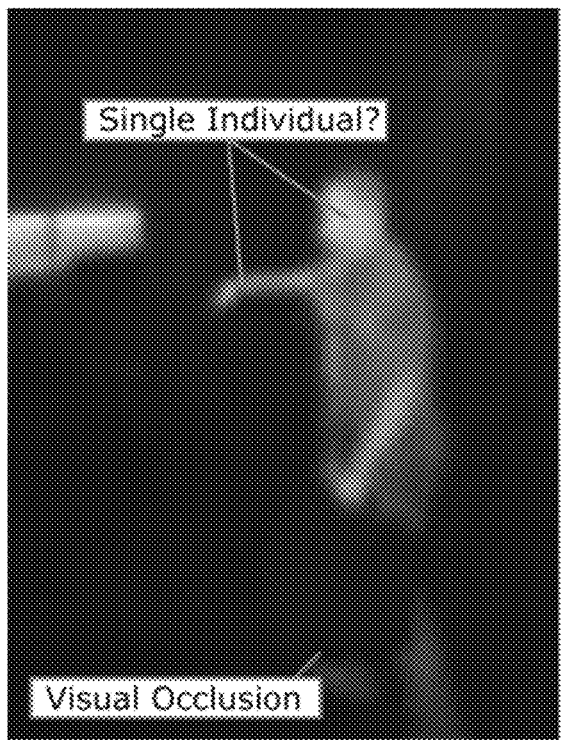
Figure 15D:
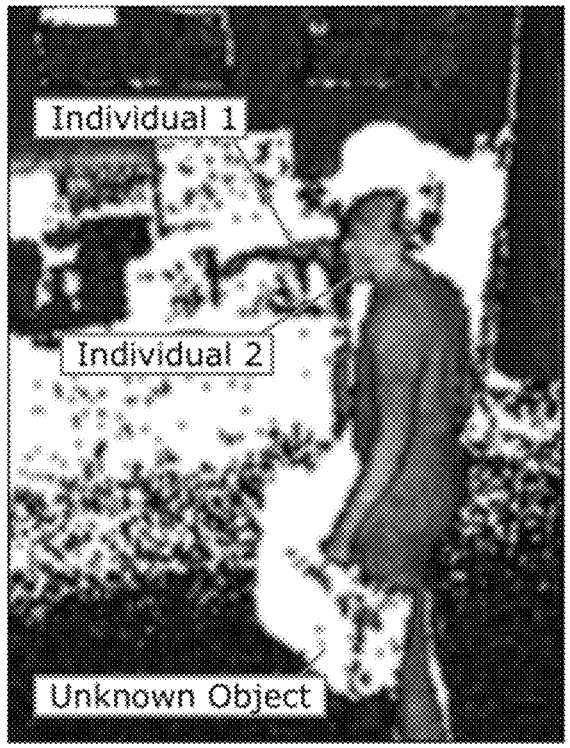

FIGS. 15A-15D provide an example of how fused thermal and depth imaging techniques provide improved detail and contextual information for real-time surveillance in various embodiments of the present technology. This illustration of how fused thermal and depth imaging techniques provide improved detail and contextual information for real-time surveillance. The images shown in FIGS. 15A-15B illustrate the increased detail provided by thermal-depth fusion. The images shown in FIGS. 15C-15D illustrate how this information is critical to surveillance accuracy and scene interpretation.

The image pair in FIGS. 15A-15B illustrates the lack of detail about the environment that can be extracted from thermal images and the contextual improvement using a thermal-depth fusion. The example provided in the image pair 15C-15D illustrates how visual occlusion can lead to different interpretations of a scene and the actions occurring within the visualization. In this instance, it is difficult to directly interpret the carried object and the clear separation between two individuals as shown in the thermal image in FIG. 15C. Introducing the depth imaging provides a profound increase in contextual information about both the structure of the environment and the separation of several different actions including the separation between both individuals due to the visual ambiguity and clearly shows the object being carried by individual two which would originally be classified as a simple visual occlusion. Stemming from the ambiguity and visual occlusions that are prevalent within thermal images, depth measurements drastically increase the spatial and environmental context of scenes captured through long-distance sensing.

Public Safety

FIGS. 16A-16C provide various illustrates of threat identification through thermal and depth fusion provided by various embodiments of the present technology. The integration of depth information can also impact the identification and interpretation of actions captured through thermal imaging which can alter the semantic meaning of the actions when spatial context is provided. One prevalent example of this is threat detection. Given a complex environment that contains multiple individuals and several different possible actions that all have unique semantic representations, it can be difficult to accurately identify actions that may present a threat within the area. There can be a multitude of different misinterpretations of actions captured using only thermal images. In FIG. 16A, a potential threat could be identified within the thermal image based on the outline of the object that the individual appears to be holding; however, with the fusion image, it is clear that the individual was in front of another hot object, giving the appearance that there was a potential threat when this was not the case. In a similar circumstance, the thermal image may illustrate that there is no threat as shown in FIG. 16B.

In the thermal image, it appears that the individual is holding an item but it is difficult to discern what the object is clearly from only the thermal profile. With the fusion image, it is clear that a weapon can be clearly identified. In a more complex scenario, visual occlusions may misguide the representation of a potential threat by masking their overall profile as shown in FIG. 16C. This case is difficult to identify because well-known threat profiles can be drastically altered to the point that they will be undefined. The spatial context of the scenario provides pivotal information about how the threat signature has been modified.

Figure 17:
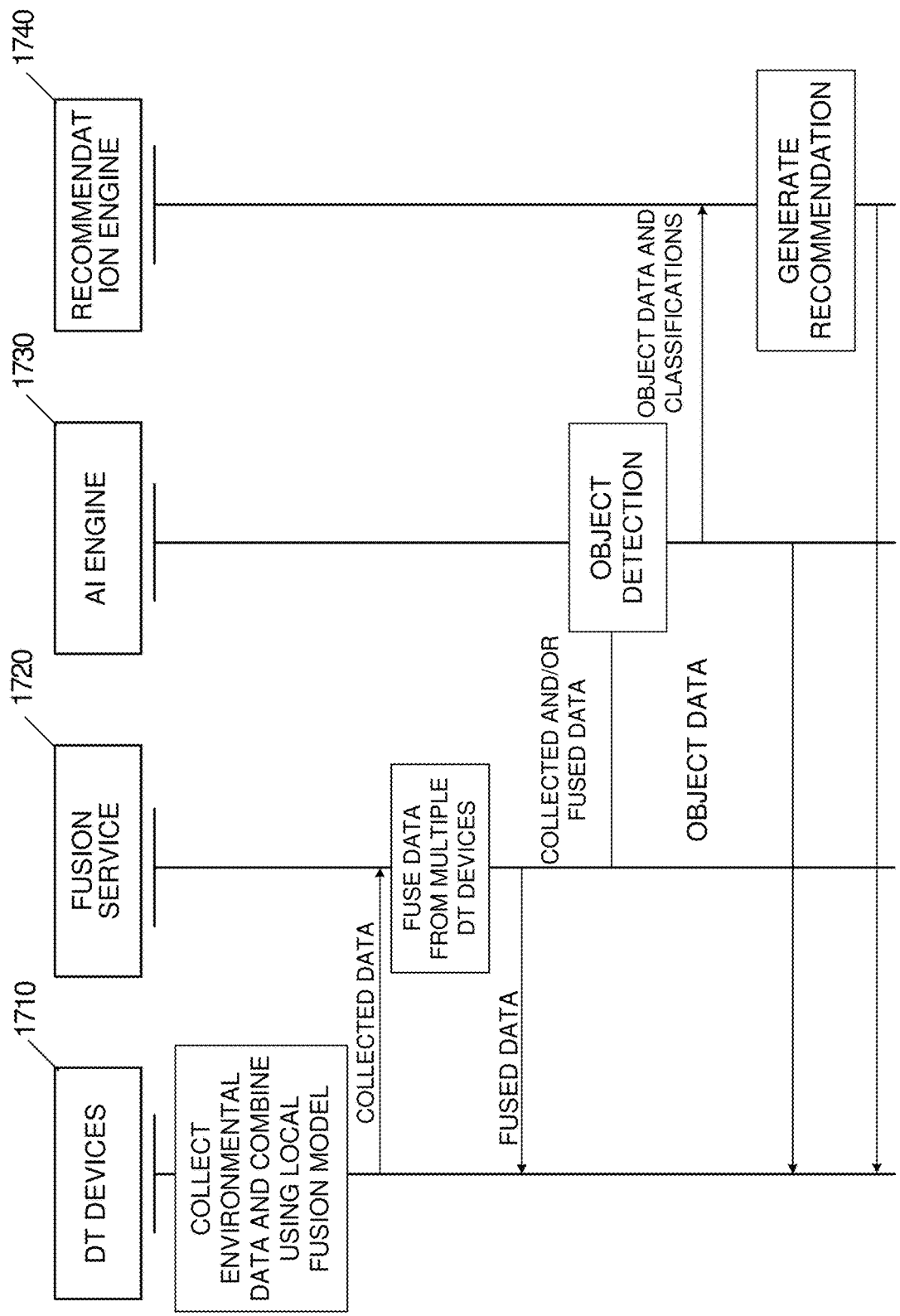
FIG. 17 is a sequence diagram illustrating an example of a set of communications of various components of a system that may be used in accordance with one or more embodiments of the present technology.

FIG. 17 is a sequence diagram illustrating an example of a set of communications of various components of a system that may be used in accordance with one or more embodiments of the present technology. As illustrated in FIG. 17, multiple depth and thermal imaging devices 1710 can collect environmental data. Each device can be running a local fusion model (e.g., customized using AI to the specific device configurations and characteristics) to generate a local fused image. The environmental data and the local fused data can be transmitted to fusion service 1720 where the data from multiple DT devices 1710 can be fused together. This can be transmitted back to each of the multiple DT devices 1710 to update the local reconstruction of the environment.

Fusion service 1720, may submit collected and/or fused data to AI engine 1730, for big data analysis and deep learning for object recognition and physical trace analysis for automated evidence collection. These results can be transmitted back to DT devices 1710 and recommendation engine 1740. Recommendation engine can generate one or more recommendations or analysis of the scene which can then be submitted back to DT devices 1710.

Exemplary Computer System Overview

Aspects and implementations of various embodiments have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 18:
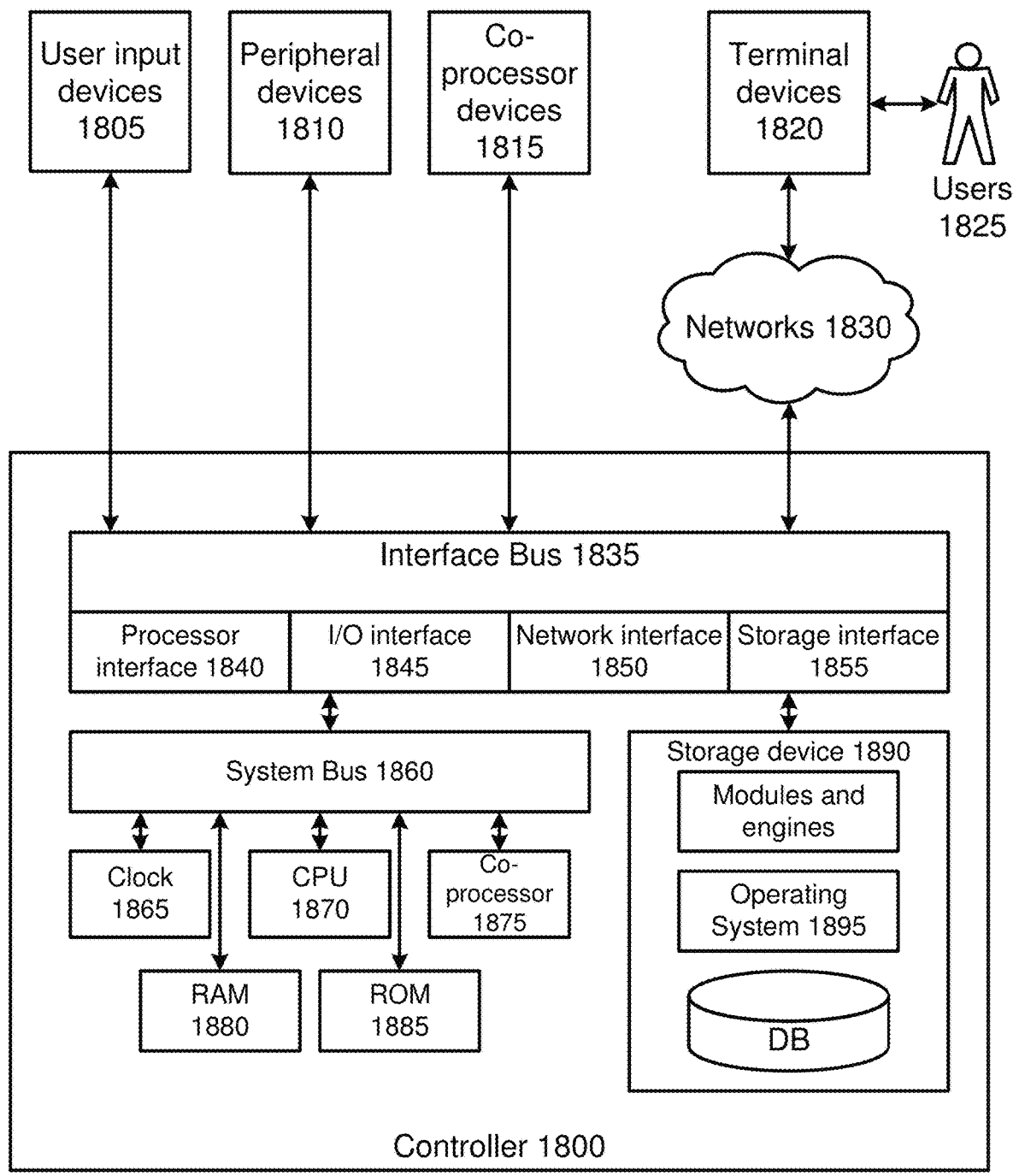
FIG. 18 is an example of a computer systemization of some components of an imaging system that may be used in one or more embodiments of the present technology.

FIG. 18 is a block diagram illustrating an example machine representing the computer systemization of some components of the present technology. The system controller 1800 may be in communication with entities including one or more users 1825 client/terminal devices 1820, user input devices 1805, peripheral devices 1810, an optional co-processor device(s) (e.g., cryptographic processor devices) 1815, and networks 1830. Users may engage with the controller 1800 via terminal devices 1820 over networks 1830.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1800 may include clock 1865, CPU 1870, memory such as read only memory (ROM) 1885 and random access memory (RAM) 1880 and co-processor 1875 among others. These controller components may be connected to a system bus 1860, and through the system bus 1860 to an interface bus 1835. Further, user input devices 1805, peripheral devices 1810, co-processor devices 1815, and the like, may be connected through the interface bus 1835 to the system bus 1860. The interface bus 1835 may be connected to a number of interface adapters such as processor interface 1840, input output interfaces (I/O) 1845, network interfaces 1850, storage interfaces 1855, and the like.

Processor interface 1840 may facilitate communication between co-processor devices 1815 and co-processor 1875. In one implementation, processor interface 1840 may expedite encryption and decryption of requests or data. Input output interfaces (I/O) 1845 facilitate communication between user input devices 1805, peripheral devices 1810, co-processor devices 1815, and/or the like and components of the controller 1800 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1850 may be in communication with the network 1830. Through the network 1830, the controller 1800 may be accessible to remote terminal devices 1820. Network interfaces 1850 may use various wired and wireless connection protocols such as, direct connect, Ethernet, wireless connection such as IEEE 802.11a-x, and the like.

Examples of network 1830 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1850 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1855 may be in communication with a number of storage devices such as, storage devices 1890, removable disc devices, and the like. The storage interfaces 1855 may use various connection protocols such as Serial Advanced Technology Attachment (SATA), IEEE 1394, Ethernet, Universal Serial Bus (USB), and the like.

User input devices 1805 and peripheral devices 1810 may be connected to I/O interface 1845 and potentially other interfaces, buses and/or components. User input devices 1805 may include card readers, finger print readers, joysticks, keyboards, microphones, mouse, remote controls, retina readers, touch screens, sensors, and/or the like. Peripheral devices 1810 may include antenna, audio devices (e.g., microphone, speakers, etc.), cameras, external processors, communication devices, radio frequency identifiers (RFIDs), scanners, printers, storage devices, transceivers, and/or the like. Co-processor devices 1815 may be connected to the controller 1800 through interface bus 1835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1800 may employ various forms of memory including on-chip CPU memory (e.g., registers), RAM 1880, ROM 1885, and storage devices 1890. Storage devices 1890 may employ any number of tangible, non-transitory storage devices or systems such as fixed or removable magnetic disk drive, an optical drive, solid state memory devices and other processor-readable storage media. Computer-executable instructions stored in the memory may include having one or more program modules such as routines, programs, objects, components, data structures, and so on that perform particular tasks or implement particular abstract data types. For example, the memory may contain operating system (OS) component 1895, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 1800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1800 may be distributed electronically over the Internet or over other networks (including wireless networks). Those skilled in the relevant art(s) will recognize that portions of the system may reside on a server computer, while corresponding portions reside on a client computer. Data structures and transmission of data particular to aspects of the controller 1800 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A guided analysis system comprising:
a set of multiple scanning devices each having a set of sensors configured to collect images of a local environment,
wherein the set of sensors in the set of multiple scanning devices include:
a thermal sensor to collect thermal images of the local environment; and
a depth sensor to collect depth images of the local environment, and
wherein each of the set of multiple scanning devices is configured to fuse together the thermal images and the depth images to create multiple sets of fused images; and
a cloud-based fusion service configured to:
receive the multiple sets of fused images of the local environments from the set of multiple scanning devices;
use artificial intelligence to extract features within the environment;
transmit a classification of the features to the set of multiple scanning devices to assist users in evaluating the local environment; and
generate, based at least in part on sequences of the collected depth and thermal images, a dynamic model describing physical changes within the local environment.

2. The guided analysis system of claim 1, wherein the thermal images and the depth images of the local environment are captured at different rates.

3. The guided analysis system of claim 1, wherein at least some of the multiple scanning devices are shaped in a mobile form factor to be worn on bodies of users.

4. The guided analysis system of claim 1, wherein the cloud-based fusion service generates a three-dimensional reconstruction of the local environment from the multiple sets of fused images.

5. The guided analysis system of claim 1, wherein the artificial intelligence identifies subjects and objects within the local environments and analyzes multiple scenes to link collected data.

6. The guided analysis system of claim 1, wherein the set of multiple scanning devices include a local fusion model that is trained using images of templates captured by sensors.

7. The guided analysis system of claim 1, wherein the fused images of the local environment include depth and thermal fusion.

8. The guided analysis system of claim 1, wherein each scanning device in the set of multiple scanning devices generates time-indexed sequences of the collected images allowing a local fusion engine to generate the fused images with temporal interpolation and spatial interpolation between entries.

9. The guided analysis system of claim 1 further comprising: an augmented reality (AR) device, or a virtual-reality (VR) device, wherein the AR device, or the VR device, includes a wearable device, glasses, or a head mounted display; and wherein the AR device, or the VR device, is configured to:
receive data representative of the classification of the features from the cloud-based fusion service; and
responsively cause a three-dimensional reconstruction or map of the local environment to be generated on a display device of the AR, or VR, device.

10. The guided analysis system of claim 1, wherein the set of multiple scanning devices is further configured to perform a predictive transformation process to spatiotemporally align the thermal, and depth, images collected by the set of sensors based on a correlation between key points and edges to facilitate the features being extracted within the local environment, and storage thereof in memory, by the cloud-based fusion service.

11. The guided analysis system of claim 1, wherein the set of multiple scanning devices is further configured to obtain dynamic scene information of the local environment including changes in heat distributions, movement of objects, structures or people, and changes to the geometric structure of an observed scene.

12. A depth and thermal imaging system comprising:
a processor;
a memory;
a set of sensors configured to obtain dynamic scene information of a local environment including changes in heat distributions, movement of objects, structures or people, and changes to the geometric structure of an observed scene, the set of sensors including:
a thermal sensor configured to collect thermal images of the local environment; and
a depth sensor configured to collect depth images of the local environment; and
a local fusion engine, under the control of the processor, configured to:
receive the thermal images and the depth images of the local environment collected by the set of sensors; and
generate a set of fused images combining the thermal images with the depth images.

13. The depth and thermal imaging system of claim 12, wherein the thermal images and the depth images of the local environment are captured at different rates.

14. The depth and thermal imaging system of claim 12, further comprising an inertial measurement unit to track positional movements and orientation changes of the system over time, wherein each of the set of multiple scanning devices is further configured to use the positional movements and orientation changes of the system to create the multiple sets of fused images.

15. The depth and thermal imaging system of claim 13, wherein the system generates a timestamp to create recorded image sequences.

16. The depth and thermal imaging system of claim 15, further comprising a local artificial intelligence engine to:
   ingest the recorded image sequences and the set of fused images; and
   identify objects or people within the local environment.

17. The depth and thermal imaging system of claim 16, wherein the remote fusion service provides a sematic labeling of the objects or people in the local environment.

18. The depth and thermal imaging system of claim 15, wherein the local fusion engine uses temporal interpolation and spatial interpolation between entries in the recorded image sequences to generate images for fusion.

19. The depth and thermal imaging system of claim 12 further comprising a communications component to communicate at least some of: the fused images, the thermal images, or the depth images, to a remote fusion service that provides a cross-referencing and data-analytics tier for spatiotemporal analysis of data of at least one of: the thermal images, and the depth images.

20. The depth and thermal imaging system of claim 12 further comprising:
   a communications component to communicate at least some of: the fused images, the thermal images, or the depth images, to a remote fusion service; and
   an augmented reality (AR), or a virtual-reality (VR), device, wherein the AR device, or the VR device, includes a wearable device, glasses, or a head mounted display, and wherein the AR device, or the VR device, is configured to:
      receive data representative of a classification of features in the local environment from the remote fusion service; and
      responsively cause a three-dimensional reconstruction or map of the local environment to be generated on a display device of the AR, or VR, device.

21. The depth and thermal imaging system of claim 12 further comprising a communications component to communicate at least some of: the fused images, the thermal images, or the depth images, to a remote fusion service, wherein the local fusion engine is further configured to perform a predictive transformation process to spatiotemporally align the thermal, and depth, images collected by the set of sensors based on a correlation between key points and edges to facilitate the features being extracted within the local environment, and storage thereof in memory, by a remote fusion service in communication with the local fusion engine.

22. The depth and thermal imaging system of claim 12 further comprising a communications component to communicate at least some of: the fused images, the thermal images, or the depth images, to a remote fusion service, wherein the communications component is configured to transmit at least some of the dynamic scene information to the remote fusion service to facilitate, generation, by the remote fusion service and based at least in part on sequences of the collected depth and thermal images, a dynamic model describing physical changes within the local environment.

* * * * *